US 011845566B2

(12) United States Patent
Smith et al.

(10) Patent No.: US 11,845,566 B2
(45) Date of Patent: Dec. 19, 2023

(54) FRAME FABRICATION LINE

(71) Applicant: The Boeing Company, Chicago, IL (US)

(72) Inventors: Daniel R. Smith, Woodinville, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,301

(22) Filed: Nov. 10, 2021

(65) Prior Publication Data

US 2022/0153448 A1    May 19, 2022

Related U.S. Application Data

(60) Provisional application No. 63/115,045, filed on Nov. 18, 2020.

(51) Int. Cl.
 *B64F 5/10*    (2017.01)
 *B23P 23/06*   (2006.01)
 *B23P 21/00*   (2006.01)

(52) U.S. Cl.
 CPC .............. *B64F 5/10* (2017.01); *B23P 23/06* (2013.01); *B23P 21/004* (2013.01); *B23P 2700/01* (2013.01)

(58) Field of Classification Search
 CPC ... B23P 2700/50; B23P 2700/01; B23P 23/06; B23P 21/004; B64F 5/10; B21D 53/92; B21D 53/74; B21D 5/14
 See application file for complete search history.

(56) References Cited

U.S. PATENT DOCUMENTS

| 9,505,051 B2* | 11/2016 | Oberoi ............... B64F 5/50 |
| 2006/0237587 A1 | 10/2006 | Luttig et al. |
| 2007/0029038 A1 | 2/2007 | Brown et al. |
| 2007/0175573 A1 | 8/2007 | Fox et al. |
| 2008/0250626 A1* | 10/2008 | Frankenberger ......... B64F 5/10 29/430 |
| 2017/0203350 A1* | 7/2017 | Okada .................. B21D 7/08 |
| 2019/0143399 A1 | 5/2019 | Kasahara et al. |
| 2021/0291254 A1* | 9/2021 | Sugai ................... B64F 5/10 |

FOREIGN PATENT DOCUMENTS

| DE | 102019211434 B3 | 11/2020 |
| EP | 1504880 A1 | 2/2005 |
| GB | 2467417 A | 8/2010 |
| WO | 02064463 A1 | 8/2002 |
| WO | WO-2020110442 A1 * | 6/2020 ............ B21D 11/14 |

OTHER PUBLICATIONS

Netherlands Patent Office Written Opinion and Search Report with English Translation, dated Jul. 1, 2021, regarding Application No. NL2027394; 12 pages.
Netherlands Patent Office Written Opinion and Search Report with English Translation, dated Jul. 1, 2021, regarding Application No. NL2027395; 13 pages.
Extended European Search Report dated Apr. 11, 2022, regarding European Application No. 21207371.2; 8 pages.
Extended European Search Report dated May 4, 2022, regarding European Application No. 21207373.8; 9 pages.

* cited by examiner

*Primary Examiner* — Christopher J Besler
(74) *Attorney, Agent, or Firm* — Yee & Associates, P.C.

(57) ABSTRACT

Systems and methods are provided for fabrication of frames for aircraft.

30 Claims, 18 Drawing Sheets

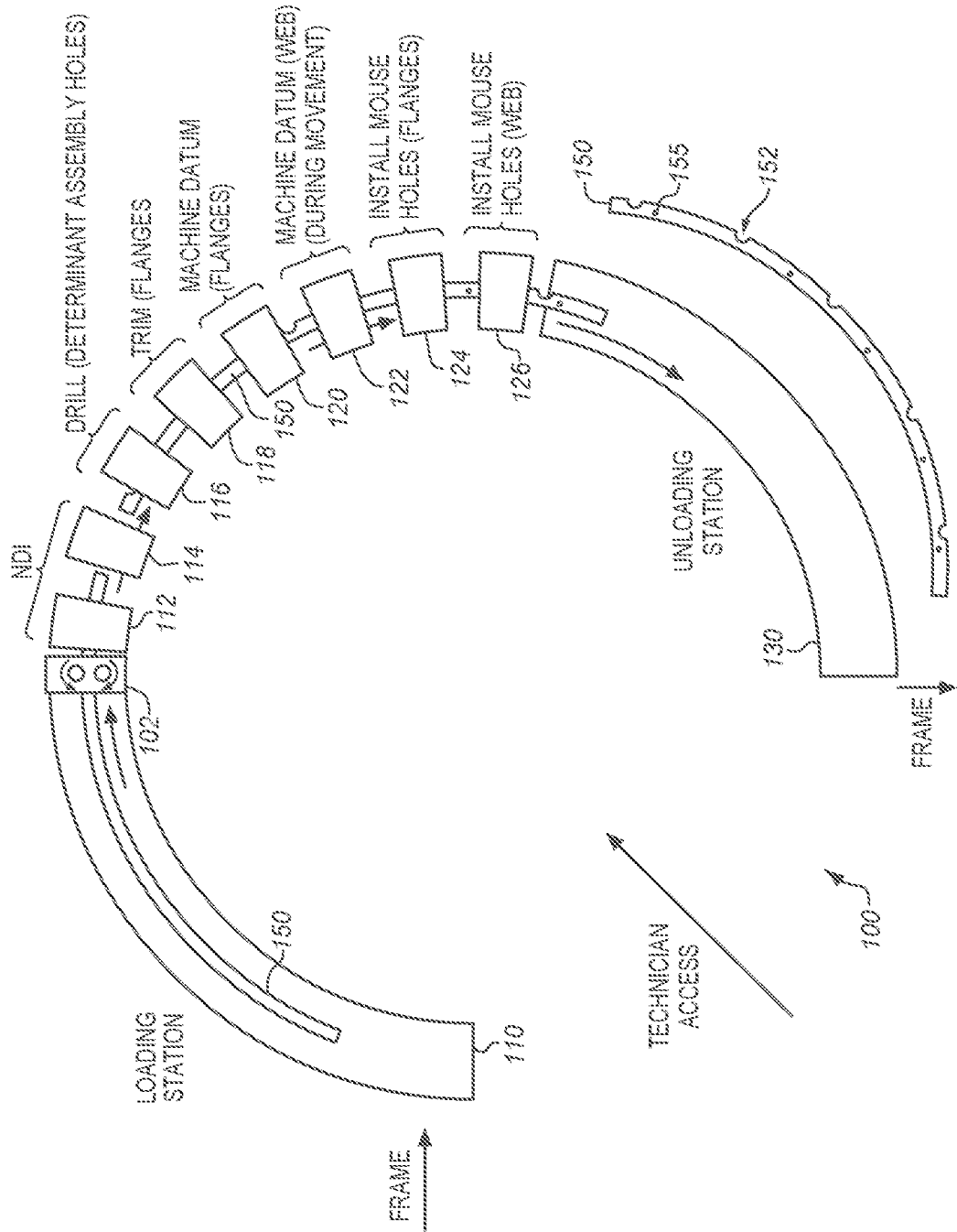

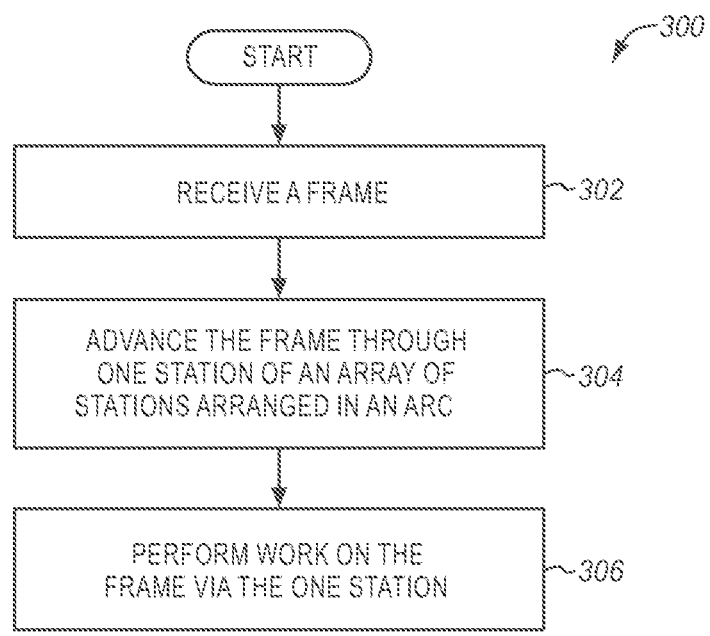

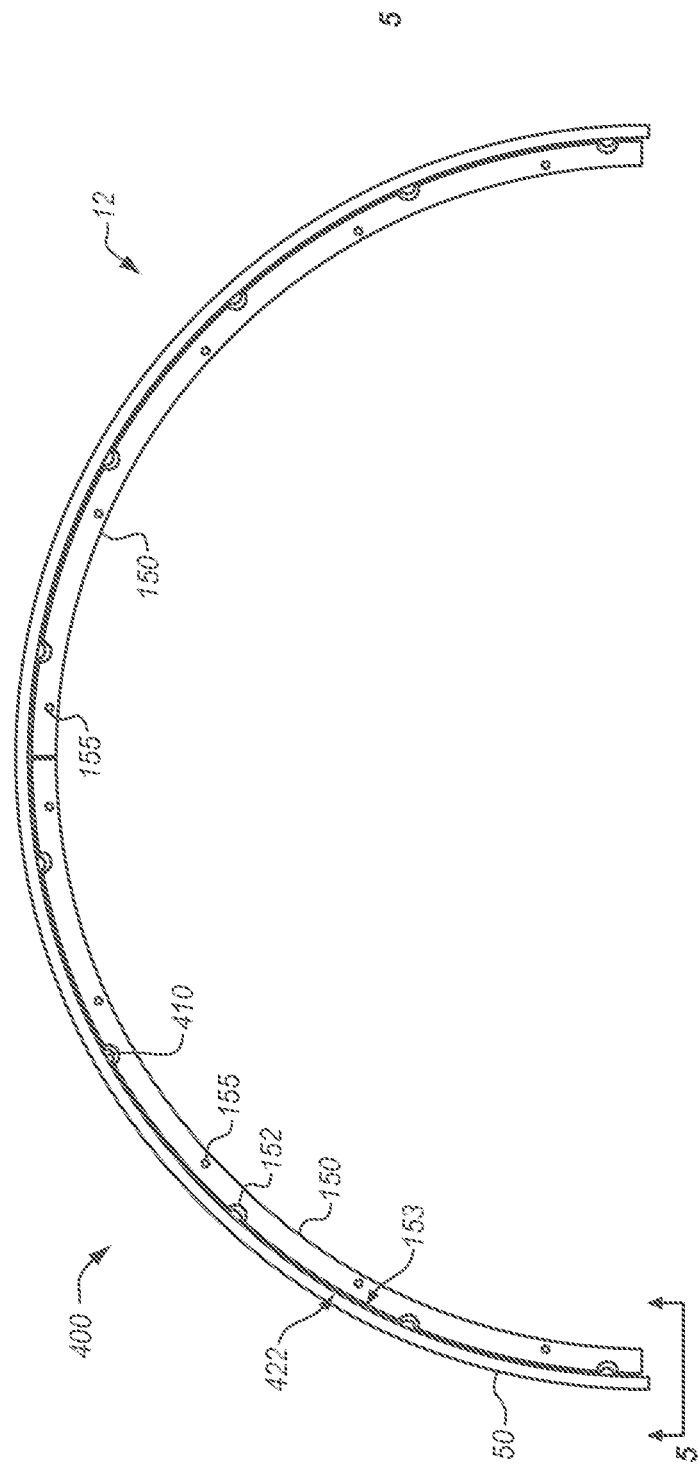

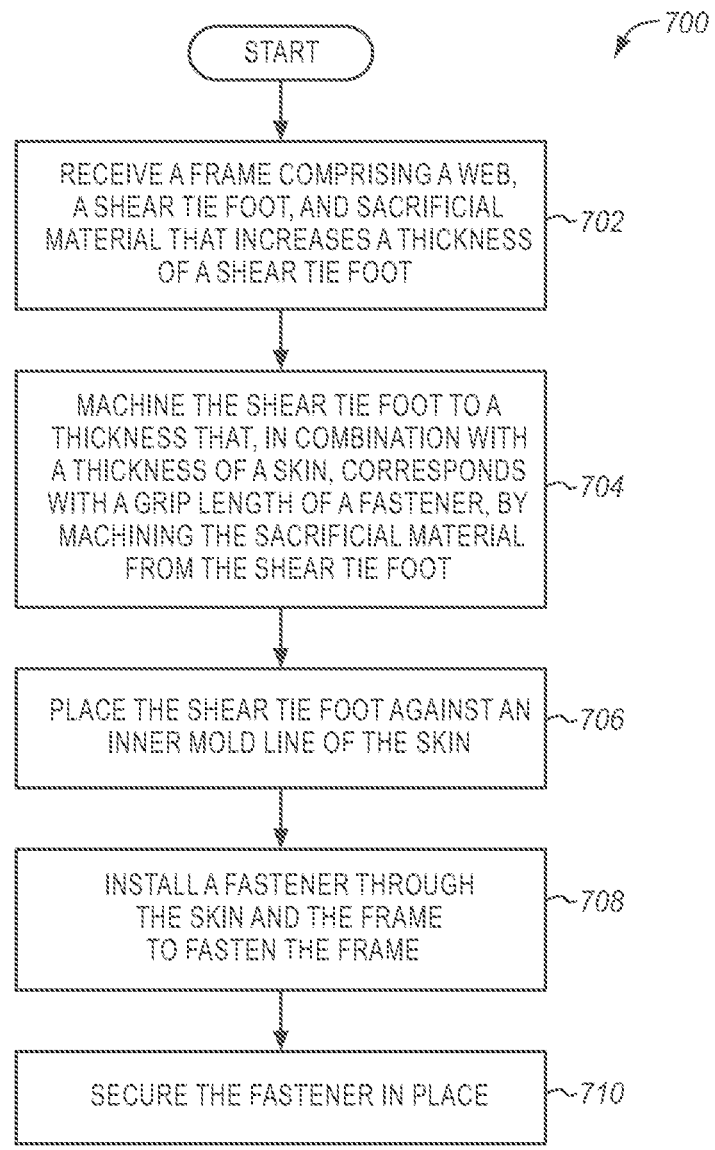

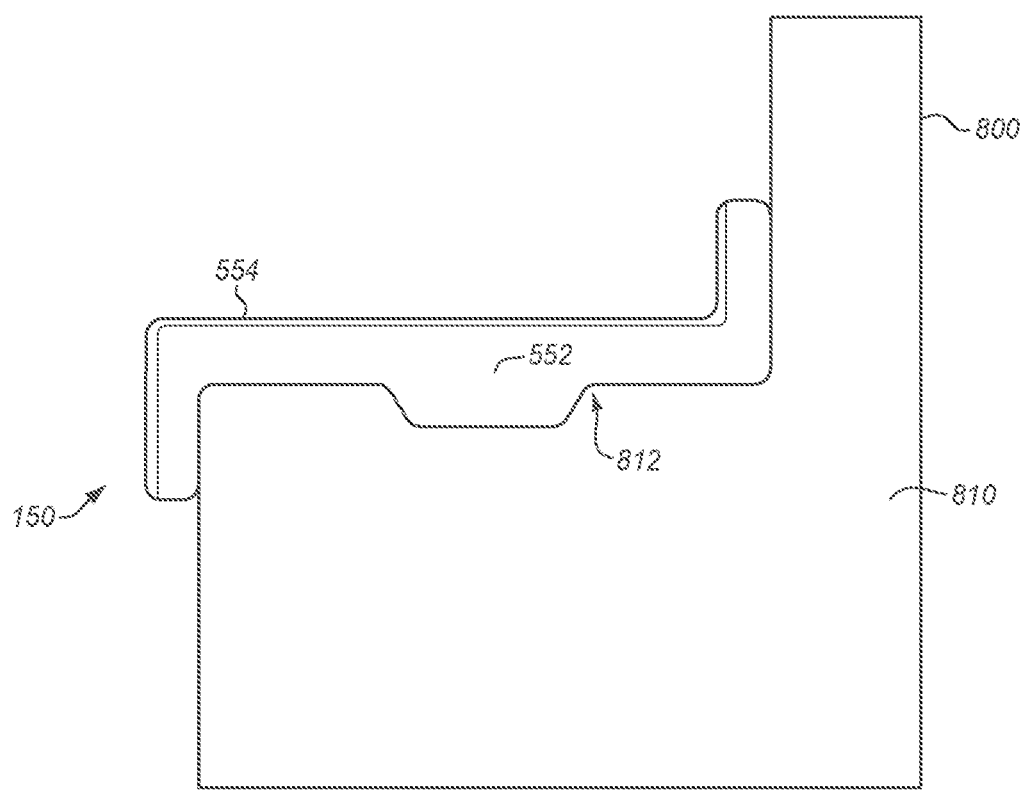

NDI (WEB & FLANGES)

NDI (RADIUS)

NDI (RADIUS)

TRIM (FLANGES)

TRIM (WEB)

MOUSE HOLE (WEB)

MOUSE HOLE
(SHEAR TIE FOOT)

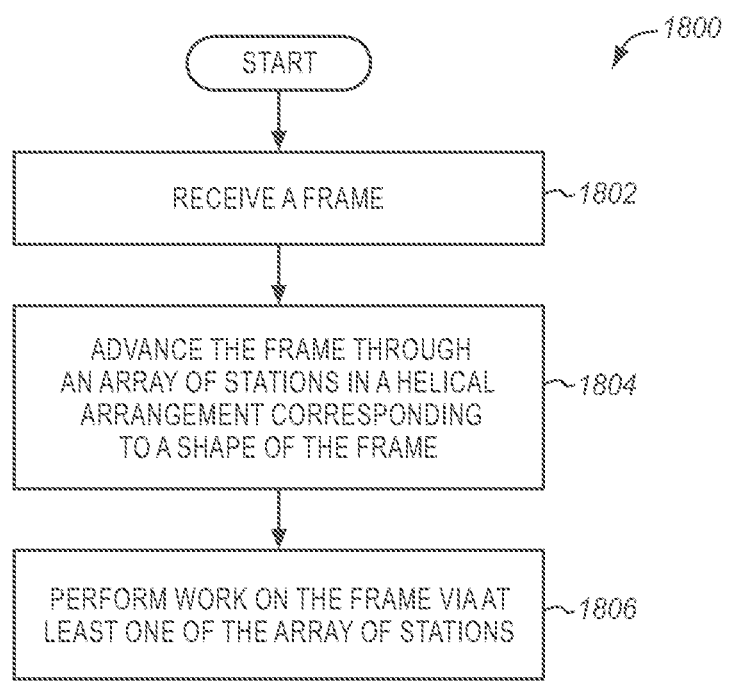

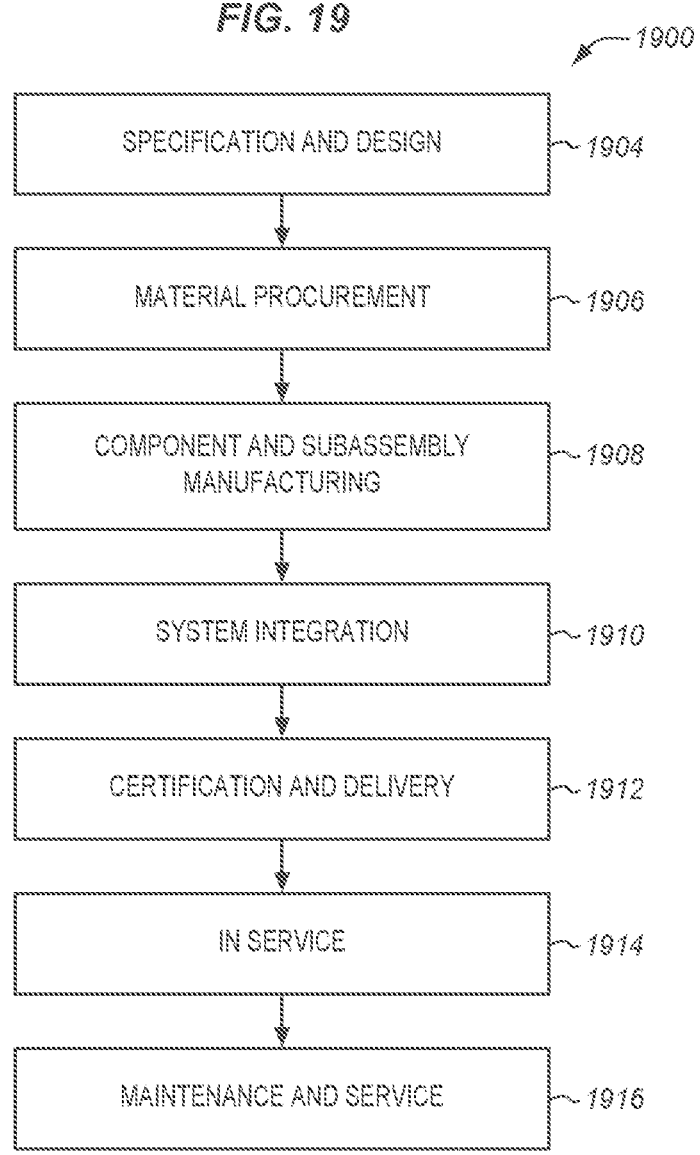
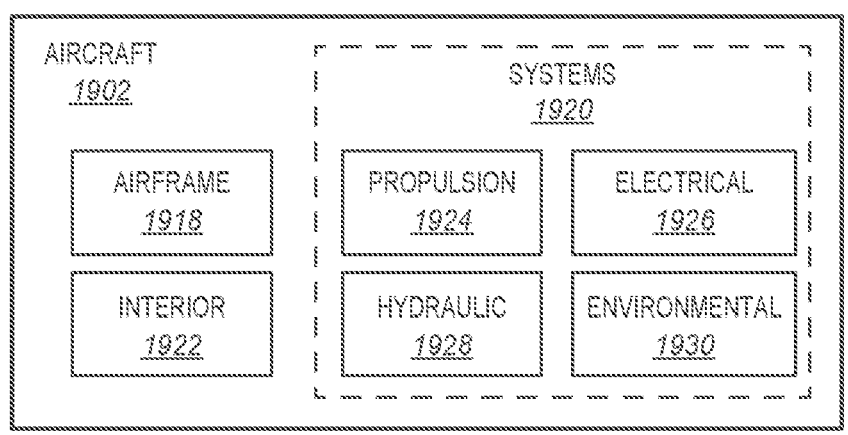

FRAME FABRICATION LINE

CROSS-REFERENCE TO RELATED APPLICATION

This application claims the benefit of U.S. Provisional Patent Application Ser. No. 63/115,045 filed Nov. 18, 2020, and entitled "Frame Fabrication Line" which is incorporated herein by reference in its entirety.

FIELD

The disclosure relates to the field of fabrication, and in particular, to fabrication of components for aircraft.

BACKGROUND

The mechanical structure of an aircraft is referred to as an airframe. The airframe itself is made from discrete components such as stringers, spars, skins, and frames which, when assembled together, define a shape of the aircraft. An individual aircraft may be fabricated from many such components. For example, an aircraft may utilize about one hundred circular frames to reinforce its fuselage. The frames are typically made from frame segments spliced together. If the frames are not fabricated quickly enough to meet with a desired assembly timing for the aircraft, fabrication of the aircraft may be undesirably delayed.

Therefore, it would be desirable to have a method and apparatus that take into account at least some of the issues discussed above, as well as other possible issues.

SUMMARY

Embodiments described herein provide assembly lines for frames for an airframe of an aircraft, and fabricate the frames as arcuate portions of a full circle. For example, each frame may correspond with a ninety-degree arc of a full hoopwise frame. The assembly lines leverage the curved nature of the frames in order to increase work density performed on the frames by stations therein, and are capable of working upon multiple frames that are advanced synchronously through the assembly lines. The assembly lines further advance the frames according to a desired takt time which is based on a takt time for the aircraft as a whole.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments of the present disclosure are now described, by way of example only, and with reference to the accompanying drawings. The same reference number represents the same element or the same type of element on all drawings.

FIG. 2 illustrates the assembly line of FIG. 1B performing work on multiple frames that are advanced synchronously in an illustrative embodiment.

FIG. 3 is a flowchart illustrating a method for operating an assembly line for a frame in an illustrative embodiment.

FIG. 4 is a front view of a section of fuselage that includes an installed frame in an illustrative embodiment.

FIG. 7 is a flowchart illustrating a method of machining a shear tie foot to fabricate a stackup for use with a predefined length of fastener in an illustrative embodiment.

FIG. 8 depicts a frame that awaits demolding from a mandrel in an illustrative embodiment.

FIG. 18 is a flowchart illustrating a further method for operating an assembly line with helical stacks to assemble a frame in an illustrative embodiment.

FIG. 19 is a flow diagram of aircraft production and service methodology in an illustrative embodiment.

FIG. 20 is a block diagram of an aircraft in an illustrative embodiment.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Airframe components, including the frames discussed herein, may be fabricated as metallic parts or as composite parts that are made from frame segments that are spliced together, such as Carbon Fiber Reinforced Polymer (CFRP) parts. CFRP parts are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1A:
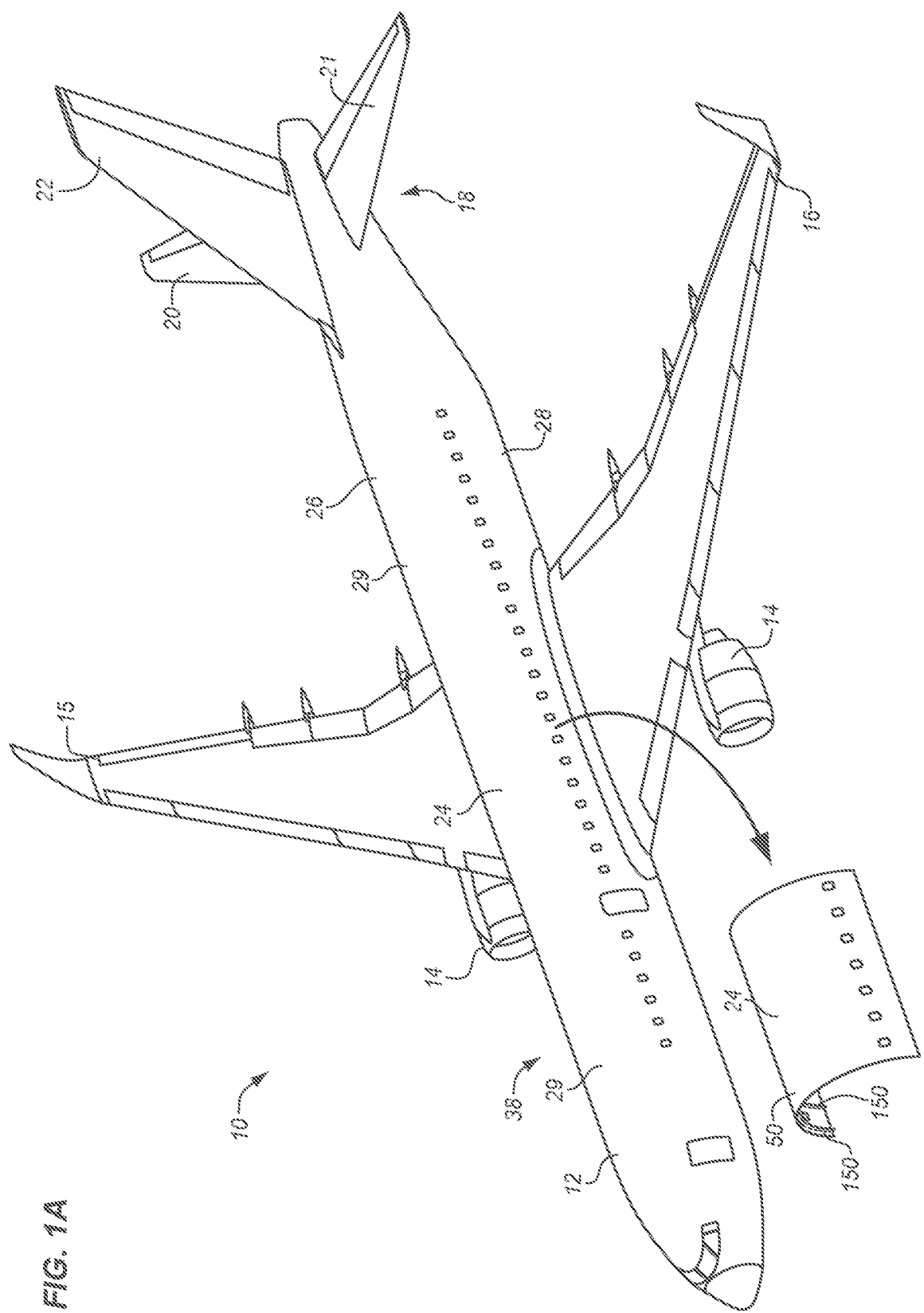
FIG. 1A is an illustration of an aircraft fabricated using half barrel sections.

Turning now to FIG. 1A, an illustration of an aircraft 10 is depicted in which the fabrication systems and methods described herein may be implemented. In this illustrative example, aircraft 10 has wing 15 and wing 16 attached to body 38. Aircraft 10 includes engine 14 attached to wing 15 and engine 14 attached to wing 16. Body 38 has tail section 18. Horizontal stabilizer 20, horizontal stabilizer 21, and vertical stabilizer 22 are attached to tail section 18 of body 38.

Aircraft 10 is an example of an aircraft 10 where at least a portion of fuselage 12 is formed of half barrel sections 24. Fuselage 12 is fabricated from half barrel sections 24 with an upper half barrel section 26 joined to a lower half barrel section 28 to form a full barrel section 29. Full barrel sections 29 are joined serially to fuselage 12. Not all full barrel sections 29 are the same shape or the same length. Half barrel sections 24 are fabricated by attaching a plurality of frames 150 to a skin 50. Frames 150 are either single piece frames or sections of frames that are fastened together.

Figure 1B:
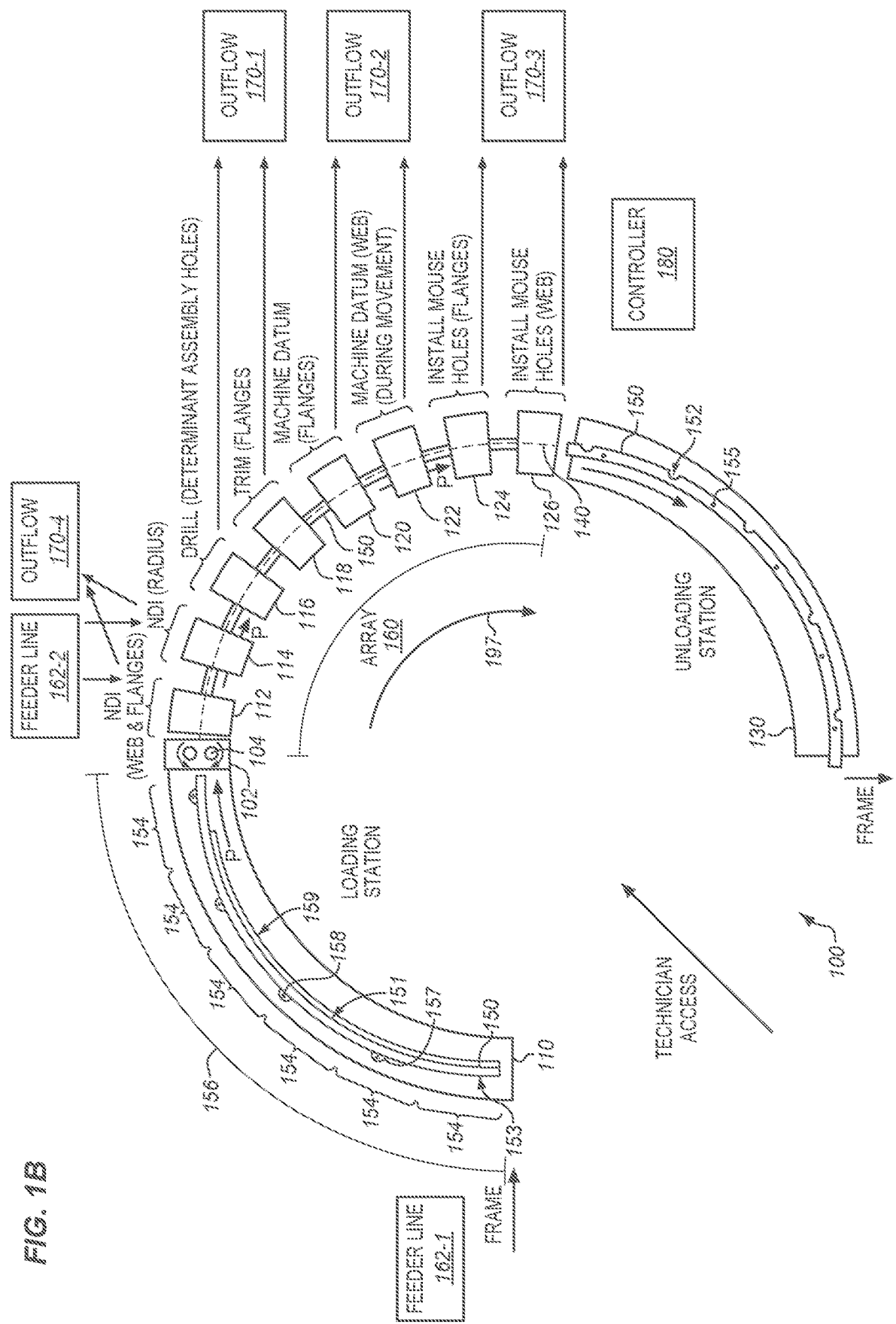
FIG. 1B illustrates an assembly line for a frame in an illustrative embodiment.

FIG. 1B illustrates an assembly line 100 for a frame 150 in an illustrative embodiment. Assembly line 100 includes an array 160 of stations that are arranged along an arc 140 and that perform work on frames 150 (e.g., arcuate frames or frames of any other suitable shape) as the frames 150 advance in a circular motion through the assembly line 100. The stations perform work upon different sections of the frame 150 at the same time. In some illustrative examples, the stations may be referred to as "work stations". The array 160 of stations is arranged in an arc 140, and is configured to perform work upon the frame 150 at the same time. Because the arc 140 of the assembly line 100 corresponds with a shape/radius of the frames 150 (e.g., is of a size between an inner and an outer radius of the frames 150, or between half an inner radius and one and a half an outer radius of the frames), the frames 150 proceed through the stations without the stations needing to accommodate the entire length, length 156, of the frames 150 at once. In other words, the station performs work on only a portion of the frame 150 within the purview of the station. This reduces the overall footprint of the assembly line 100 on a factory floor. Furthermore, because the stations each handle a different one of lengthwise sections 154 of a frame 150, multiple stations can perform work on a single frame, frame 150, but concurrently at different sections. For example, a machining station can remove material from a frame 150 at a first section while a Non-Destructive Inspection (NDI) station inspects the frame 150 at a second section. This feature massively increases work density, which enables frames 150 to be fabricated at a high rate without the need for a large assembly line (e.g., a lengthy or voluminous assembly line). In further embodiments, the frame 150 is advanced along a path that does not precisely match the radius of the frame 150.

In this embodiment, the frames 150 include indexing features 158 that are disposed within a manufacturing excess 157 (e.g., an excess thickness, a pad-up, tab, ramp, etc.) which is later trimmed off of the frame 150. These indexing features 158 may comprise hard stops, pins, holes, or grooves that are complementary to the sections (and/or tooling such as layup mandrels for the sections) for physical securement thereto. In further embodiments, the indexing features 158 comprise laser, ultrasonic, or visual inspection systems that track indexing features, indexing features 158, located at the sections, or even RFID chips. Non-contact techniques for indexing may be utilized, for example, within assembly lines that continuously move fuselage components. In some illustrative examples, each station is configured to index to the frame 150 and perform work on the frame 150. In one embodiment, the stations index to the indexing features 158 at a manufacturing excess 157 of the frame 150. The frames 150 are illustrated as having a constant radius, but may exhibit a variety of radii according to design parameters.

During movement or in between pulses (e.g., "micro pulses" of less than a length of a frame, or "full pulses" of equal to or greater length than a frame), a station encounters the indexing features 158. The station physically interacts with or nondestructively inspects the indexing features 158 at lengthwise sections 154 of the frame, in a manner that enables a section of the frame 150 exposed to the station to be aligned to the station before work is performed. That is, the structure being pulsed includes indexing features 158. The indexing features 158, such as physical features or Radio Frequency Identifier (RFID) chips, are engaged by an indexing engaging device associated with the station. In one embodiment, the indexing features 158 also convey to the station a 3D characterization of the Inner Mold Line (EVIL) and/or Outer Mold Line (OML) shape of the structure (e.g., a specific one of the many different frames 150 that might be fabricated) within the purview of the station, as well as instructions indicating work to be performed by the station upon the structure. In some illustrative examples, the section is one of lengthwise sections 154. This process can be performed by multiple stations at once for different lengthwise sections 154 of the frame 150. Furthermore, the circular nature of the assembly line 100 accommodates the radius of the frames 150 being assembled, and has a radius that corresponds with (e.g., is between half and double) the radius of the frames 150. In this embodiment, the stations include a loading station 110 which receives a frame 150 provided by a feeder line 162-1. Prior to receipt, the frames 150 undergo a rough trim (if needed) at a layup mandrel (not shown) at the feeder line 162-1 after being hardened, and are then demolded. In these illustrative examples, frame 150 can be referred to as a hardened composite frame. In some other illustrative examples, frame 150 is a metal frame. The frame 150 is placed onto the loading station 110, and is presented to a drive unit 102. The drive unit 102 is configured to advance the frame through the assembly line 100. In some illustrative examples, the drive unit 102 is configured to advance the frame 150 by pulsing the frame 150 through the stations by a distance less than a length of the frame 150. In some of these illustrative examples, the stations of the array 160 are configured to perform work on the frame 150 during pauses between pulses of the frame 150. In some other illustrative examples, the stations of the array 160 are configured to perform work on the frame 150 while the frame 150 advances during a pulse. In some illustrative examples, the drive unit 102 is configured to physically interlock with a tool 159 carrying the frame 150. In some illustrative examples, the drive unit 102 is configured to physically interlock with a manufacturing excess 157 of the frame 150. In some illustrative examples, the drive unit 102 is configured to advance the frame 150 in a circular motion that follows the arc 140, the arc 140 having a radius that corresponds with a radius of the frame 150.

The drive unit 102 utilizes powered rollers 104, which align and advance the frame 150 along the arc 140 through multiple stations of the array 160 of stations (e.g., in a counterclockwise direction, clockwise direction, or any other direction). Depending on embodiment, rollers 104 can utilize pinch force that prevents slippage of the frame 150 during driving operations, or can utilize teeth or clocking systems to couple with or physically interlock with the frame 150 and advance the frame 150 in a predictable manner. For example, in one embodiment the teeth or clocking systems physically interlock with a manufacturing excess 157 of the frames 150. Thus, in one embodiment, advancing the frame 150 comprises physically interlocking a drive unit 102 to a manufacturing excess 157 of the frame 150. In a further embodiment, the drive unit 102 interlocks or mates with a mandrel or tool 159 that carries the frame 150. In such cases, the stations may index to indexing features 158 at the tool 159 and/or at the frame 150. In such embodiments, the frame 150 is held by the tool 159, and the tool 159 includes the indexing features 158. The tool 159 is then advanced through the array of stations, for example by interlocking a drive unit 102 with the tool 159 while the tool 159 carries the frame 150.

In one embodiment, the drive unit 102 advances the frame 150 in a pulsed fashion (i.e., by pulsing the frame 150) along a process direction 197 (e.g., a curved, clockwise, or counterclockwise, or any other suitable type of direction), wherein the frame 150 is "micro pulsed" by a pulse distance (P) less than its length along the arc 140, then is paused, then advances again by the same amount. In a further embodiment, the frame 150 is pulsed through the stations by a distance equal to its length, or is advanced continuously through the stations. The drive unit 102 causes the frame 150 to undergo circular motion by operating the powered rollers 104 along the curvature of the frame 150. That, is, the arc 140 has a similar radius to the frame 150, and the frame 150 curves along the arc 140 as it proceeds through the stations of the array 160. The circular motion follows the arc 140, which has a radius corresponding with a radius of the frame 150. In a further embodiment, the drive unit 102 advances the frame 150 continuously. In still further embodiments, multiple drive units 102 are arranged along the arc in order to align and advance multiple ones of the frames 150 in a stable and predictable fashion.

The drive unit 102 advances to Non-Destructive Inspection (NDI) stations 112 and 114. The NDI stations 112 and 114 are disposed upstream of machining stations 120 and 122 in the array 160, and inspect the frame 150. In some illustrative examples, NDI station 112 is configured to inspect a web and flanges of the frame. Specifically, NDI station 112 inspects a web and flanges of the frame 150 to determine dimensions of lengthwise sections 154 of the frame 150. This detects out of tolerance conditions and inconsistencies (e.g., pores that are out of tolerance, deviations in overall thickness that are out of tolerance, etc.). As used herein, a flange may refer to either or both of a shear tie foot 562 or a flange 566 as further illustrated with respect to FIG. 5. In some illustrative examples, the array 160 of stations further comprises an additional NDI station 114 configured to inspect a radius of the frame 150. NDI station 114 inspects the radius of the frame 150. In one embodiment, this comprises attaching the NDI station 114 to an Inner Mold Line (IML) 151 of the frame 150, or attaching the NDI station 114 to an Outer Mold Line (OML) 153 of the frame 150, and then determining deflection of the NDI station 114 from an expected IML or OML as the NDI station 114 and the frame 150 move relative to each other. Feeder lines 162-2 provide materials, for example, such as water to the NDI stations 112 and 114 in order to facilitate the operations of these stations, and also may be utilized to output inspection information from the NDI stations 112 and 114.

The frame 150 advances from the Non-Destructive Inspection (NDI) stations 112 and 114 to a rework station (if rework is needed, thus not shown) just downstream of the NDI stations 112 and 114. In the normal course, NDI stations 112 and 114 are followed by a drilling station 116. In some illustrative examples, the array 160 of stations includes a drilling station 116, disposed downstream of the NDI station 112, and configured to drill Determinant Assembly (DA) holes 155 into lengthwise sections 154 of the frame 150. The drilling station 116 is disposed downstream of the NDI stations 112 and 114, and drills/installs Determinant Assembly (DA) holes 155 into lengthwise sections 154 of the frame 150. The DA holes 155 facilitate assembly of the frame 150 to other airframe components.

The frame 150 further advances to trimming station 118 and machining stations 120 and 122, which are disposed downstream of the drilling station 116. However, in further embodiments the order of trimming station 118, machining stations 120 and 122, and/or drilling station 116, is altered from what is depicted. The machining stations 120 and 122 trim the lengthwise sections 154 of the frame to form datum planes at the frame 150. In some illustrative examples, the array 160 of stations includes a machining station 122, disposed downstream of the drilling station 116, and configured to trim lengthwise sections 154 of the frame 150 to form datum planes at the frame 150. In further embodiments, additional data planes are formed via layup and curing at a layup mandrel, prior to machining or milling. Specifically, the machining stations 120 and 122 machine the frame 150 to remove sacrificial material (e.g., from a shear tie foot 562 (shown in FIG. 5) of the frame 150 at lengthwise sections 154) until a desired datum plane is achieved that facilitates alignment of the frame 150 during assembly. In this embodiment, machining station 120 removes sacrificial material from flanges of the frame 150 during pauses between pulses of the frame 150, while machining station 122 removes sacrificial material from a web 564 (shown in FIG. 5) of the frame 150 while the frame 150 advances during a pulse. In such an embodiment, a drive unit 102 advances a frame 150 by pulsing the frame 150 through a machining station 120, 122 by less than a length of the frame 150. This is referred to as a "micro pulse." In further embodiments, the frame 150 undergoes a full pulse wherein it is pulsed by at least its length. In still further embodiments, one or more Non-Destructive Inspection (NDI) stations 112 and 114 are disposed upstream or downstream of one or more of the machining station 120 and the machining station 122.

Cut-out stations 124 and 126 are disposed downstream of the machining stations 120 and 122. The cut-out stations 124 and 126 cut out material from lengthwise sections 154 of the frame 150 in order to form mouse holes 152. In some illustrative examples, the array 160 of stations includes a cut-out station 126, disposed downstream of the machining station 122, that is configured to cut out mouse holes 152 from lengthwise sections 154 of the frame 150. Mouse holes 152 accommodate stringers that are attached to a fuselage skin 50 of the aircraft 10 (as depicted in FIGS. 1 and 4), by allowing those stringers to pass through the frame 150 without physical interference. That is, the mouse holes 152 enable the frame 150 to bridge across any stringers at a fuselage skin 50. In this embodiment, the cut-out stations 124 and 126 comprise cutters that are driven into the frame 150 during pauses between pulses and then retracted. Cut-out station 124 cuts flanges of the frame 150, while cut-out station 126 cuts the web of the frame 150. After the flanges and web are cut at corresponding locations, a mouse hole 152 is formed. Additional and/or alternative stations (not shown) may perform further subtractive manufacturing operations upon the frame 150.

Further stations, such as end sealing stations (e.g., edge sealing stations, trimmed edge sealing stations, etc.), painting stations, stations for installing stow bins and wire brackets, or other small parts, etc., can also be included within array 160, depending on design constraints and constraints imposed by other components of an aircraft production system. For example, these stations can be included downstream of trimming station 118 and/or machining stations 120 and 122 and upstream of sealing and/or painting stations and an edge scanning Non-Destructive Inspection (NDI) station (not shown). Furthermore, the number of each type of station can vary depending on an amount of work expected to be performed during each pulse. For example, if a station for machining is incapable of working at a speed that matches a takt time for the frame 150, an additional station for machining is added during the design phase to ensure that takt time is consistently met.

Feeder lines 162-1 and 162-2 may fabricate any suitable components for use by the stations. These components can include fasteners, adhesives, blades, etc. for just-in-time (JIT) insertion of components into the assembly line 100. For example, feeder line 162-1 provides frames 150, and feeder line 162-2 provides water to Non-Destructive Inspection (NDI) stations 112 and 114. The feeder lines 162-1 and 162-2 may be implemented in parallel with each other to feed materials to the same station or different stations JIT for the requirements of those stations.

Dust, debris, and manufacturing excess removed during the operations of stations 116-126 is removed from the assembly line 100 via outflows 170-1 through 170-4. Depending on embodiment and application, outflows 170-1 through 170-4 can comprise vacuum systems, chutes, conveyors, or other systems that physically remove this material from the assembly line 100. In many embodiments, the removal is automated to ensure that workers do not have to stop the line and periodically spend time cleaning up. In this embodiment, outflow 170-1 removes scrap material from drilling and trimming, outflow 170-2 removes machined debris, outflow 170-3 removes mouse hole pieces, and outflow 170-4 provides inspection data for use by downstream stations and/or a controller 180 that manages the operations of the assembly line 100.

In further embodiments, the stations of array 160 are adjustable and capable of accommodating frames 150 of a variety of sizes for a variety of models of aircraft 10. For example, the stations may include blades that have adjustable positions, may exhibit a dynamic range of motion, etc. In one embodiment, the stations include accommodations within the line to handle frames 150 of greater or lesser diameter. The assembly line 100 can also accommodate various lengths of frames 150 of the same model or different models. Stations that remain static as the frame 150 passes perform "drive by processing," while stations that affix to the frames 150 or carry a tool that progresses with the frame 150 are referred to as performing "hitchhiker processing." Stations that perform hitchhiker processing may return to an initial start position after completing work on a frame 150, in order to be ready to receive a next frame 150. Stations can even be mounted to the frame 150 during transit, in order to move with the frame 150 and perform work (e.g., by advancing along tracks mounted to the frame 150) while the frame 150 advances.

In still further embodiments, the assembly line 100 extends for more than three hundred and sixty degrees in a vertical corkscrew or helical pattern, by ascending or descending such that stations which are separated from each other by three hundred and sixty degrees are vertically separated from each other. In embodiments where the assembly line 100 forms a full circle, a frame 150 can be cycled through the assembly line 100 multiple times to receive work from the stations before the frame 150 is completed and ready to exit the assembly line 100. A technician may enter the assembly line 100 by walking through an open portion of the assembly line 100 (indicated by "technician access") although in further embodiments the technician steps under or over portions of the assembly line 100 and/or frames 150. In further embodiments, the stations are arranged across multiple circular or helical silos that corkscrew upwards vertically and are coupled together, in order to receive all desired processing operations. That is, each of the helical silos corkscrews vertically upward or downward in multiple rotations, and stations are disposed along the lengths of these helical silos. This arrangement increases work density by decreasing an amount of floor space needed by the assembly line 100.

Eventually the frame 150 reaches an unloading station 130, wherein the entirety of the frame 150 is removed from the assembly line 100 and fed to another assembly line (such as an assembly line for a section of fuselage 12), wherein a frame installation station installs the frame 150 onto the section of fuselage 12 (e.g., onto a half barrel section 24). In one embodiment, a fabrication rate of the assembly line 100 is based on the desired takt time for that assembly line that it feeds.

A controller 180 manages the overall operations of the stations of array 160, and may further manage the operations of the feeder lines 162-1 and 162-2 and outflows 170-1 through 170-4 discussed herein. In pulsed environments, the pulse length, pulse time, and pause time is synchronized across all stations and frames 150 by one or more controllers 180 according to a predetermined takt time (i.e., a desired production rate for the factory as a whole). Thus, the amount of work assigned to each station is based on the uniform pulse length, pulse time, and/or pause time (depending on whether the station performs its work during a pulse or a pause). Because the stations perform work synchronously (e.g., during the same pause or pulse), because the amount of work assigned to each station corresponds with the expected rate of travel, and because the frames 150 move synchronously through the assembly line 100 according to the predetermined takt time, the frames 150 are fabricated according to desired production rates. In one embodiment, controller 180 is implemented as custom circuitry, as a hardware processor executing programmed instructions stored in memory, or some combination thereof.

FIG. 2 illustrates the assembly line 100 of FIG. 1B performing work on multiple frames 150 that are advanced synchronously in an illustrative embodiment. The frames 150 can be different types of frame 150 for a single model of aircraft 10, or can even be different types of frames 150 for different models of aircraft 10. In FIG. 2, multiple frames 150 are proceeding through the array 160 of stations to receive work, and a completed frame 150, including DA holes 155 and mouse holes 152, exits the assembly line 100 in order to feed a downstream assembly line that installs the frames 150 onto a fuselage skin 50. FIG. 2 provides additional context over FIG. 1B by illustrating how multiple frames 150 can be processed at once along the assembly line 100. In FIG. 2, a first frame of frames 150 is in within the purview of Non-Destructive Inspection (NDI) station 112 and a second frame of frames 150 downstream of the first frame is within the purview of drilling station 116, trimming station 118, machining stations 120 and 122, and cut-out stations 124 and 126. In further embodiments, multiple stations work at the same time on one frame 150, while multiple stations are working at the same time on another frame 150 arranged serially in the assembly line 100. For example, NDI stations 112 and 114 may perform inspection processes on a first frame while drilling station 116 and trimming station 118 perform work on that first frame, while machining stations 120 and 122 may perform work on a second frame that is disposed downstream of the first frame.

Illustrative details of the operation of assembly line 100 will be discussed with regard to FIG. 3. Assume, for this embodiment, that a frame (e.g., a frame 150 that is arcuate and comprises a ninety degree arc, a sixty degree arc, a one hundred and twenty degree arc, or any suitable arc length) has been hardened from a preform, and is loaded at a feeder line 162-1 that provides frames 150 according to a takt time designed for assembly line 100. In further embodiments, a similar radial assembly line is utilized used to fabricate curved portions of window surrounds and door surrounds.

FIG. 3 is a flowchart illustrating a method 300 for operating an assembly line to fabricate a frame in an illustrative embodiment. The steps of method 300 are described with reference to assembly line 100 of FIG. 1B, but those skilled in the art will appreciate that method 300 may be performed in other systems. The steps of the flowcharts described herein are not all inclusive and may include other steps not shown. The steps described herein may also be performed in an alternative order.

FIG. 3 is a flowchart illustrating a method 300 for operating an assembly line 100 to fabricate a frame 150 in an illustrative embodiment. According to FIG. 3, method 300 includes receiving a frame 150 in step 302. The frame 150 comprises one of a metal frame 150 or a hardened composite frame 150. Receiving the frame 150 comprises placing the frame 150 at loading station 110. Step 304 includes advancing the frame 150 through one station of an array 160 of stations arranged in an arc. In some illustrative examples, step 304 includes advancing the frame 150 through one or more of a series/array of stations arranged in an arc corresponding to a shape of the frame 150. In some illustrative examples, frame 150 is referred to as an arcuate frame. In some illustrative examples, advancing the frame 150 through the one station of the array 160 of stations comprises advancing the frame 150 along the arc clockwise. In some illustrative examples, advancing the frame 150 through the one station of the array 160 of stations comprises advancing the frame 150 along the arc counterclockwise. In one embodiment, advancing the frame 150 comprises pulsing the frame 150 through the stations by a distance less than its length (i.e., a "micro pulse"), then pausing the frame 150, then pulsing the frame 150 again, and so on. In this embodiment, advancing the frame 150 comprises causing the frame 150 to undergo circular motion as the frame 150 follows arc 140. That is, the circular motion follows an arc 140 having a radius that corresponds with a radius of the frame 150.

Step 306 includes performing work on the frame 150 via the one station. In some illustrative examples, step 306 comprises performing work on the frame 150 via the one or more stations upon the frame 150, such as performing work via multiple stations upon different sections of the frame 150 at the same time. In some illustrative examples, step 306 comprises performing work on the frame via multiple stations upon different sections of the arcuate frame 150 during a same period of time. For some stations, such as cut-out stations 124 and 126, performing work on the frame 150 occurs during pauses between pulses of the frame 150. For other stations, such as machining station 122, performing work on the frame 150 is performed while the frame 150 advances during a pulse, and/or during a pause between pulses, or while the frame 150 advances continuously. For example, when movement of a machining device (e.g., mill or trimmer) relative to the frame 150 is desired, some trimming or milling is performed while paused, wherein tooling moves relative to the frame 150.

Method 300 provides a benefit over prior techniques because it enables frames 150 to be assembled at a high rate of speed while also increasing work density. This makes the radius of the frame 150 advantageous when performing post cure production. This in turn reduces the amount of space occupied by the assembly line 100 at the factory floor, and ensures rigid compliance with takt time requirements.

FIG. 4 is a front view of a section of fuselage 12 that includes an installed frame 150 in an illustrative embodiment. Thus, after a frame 150 has exited the assembly line 100, it arrives at the section 400 of fuselage 12 depicted in FIG. 4. The mouse holes 152 of the frame 150 are aligned with stringers 410 at the section 400 of fuselage 12, while an OML 153 of the frame 150 aligns with an IML 422 of a skin 50 of the section 400 of fuselage 12.

Figure 5:
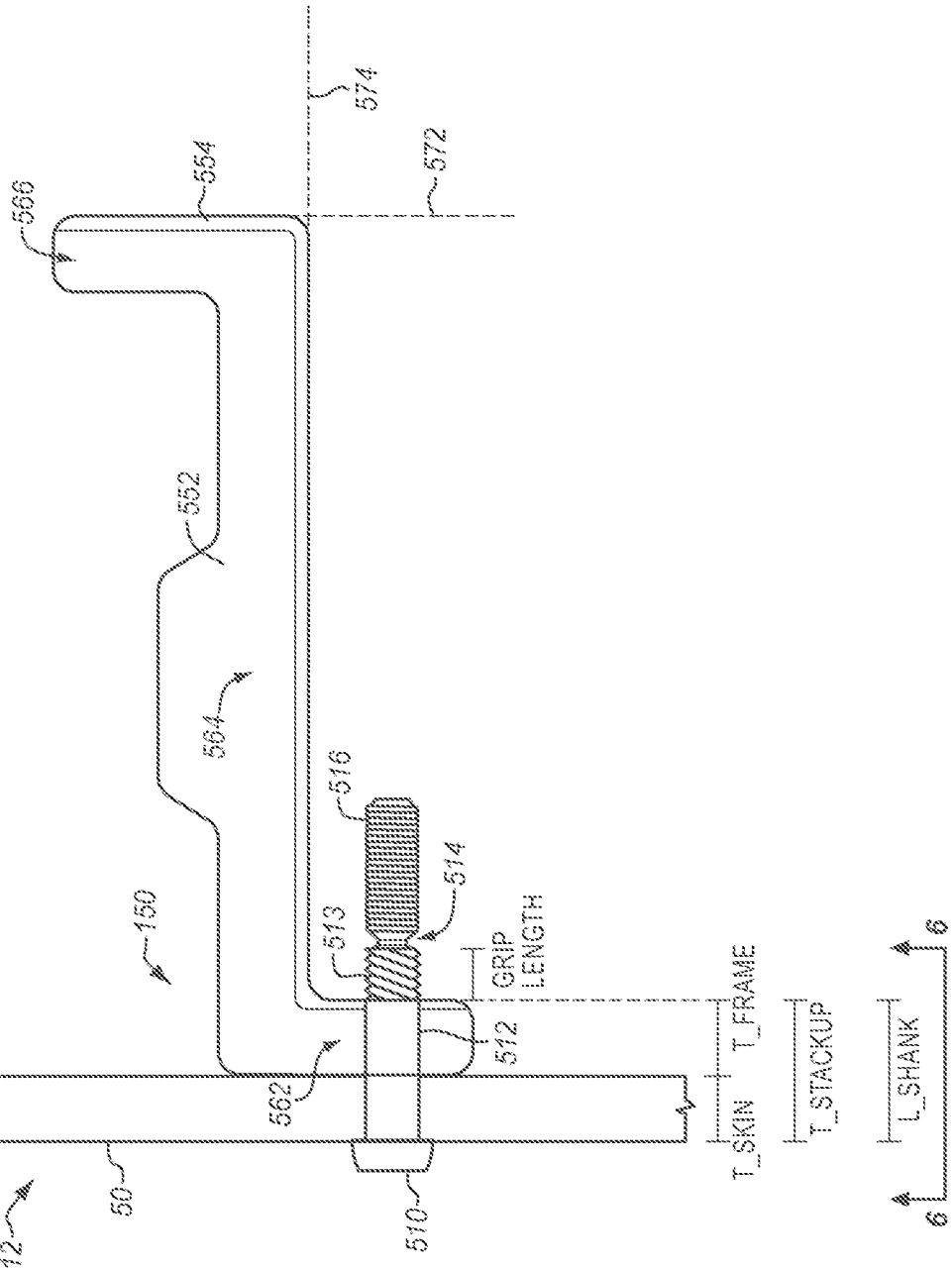
FIG. 5 is an end view of the frame of FIG. 4 in an illustrative embodiment.

FIG. 5 is a zoomed in end view of the frame 150 of FIG. 4 in an illustrative embodiment, and corresponds with view arrows 5 of FIG. 4. In this embodiment, the frame 150 exhibits a cross-sectional shape in the form of a "Z," however, any suitable shape may be chosen, including "I," "C," "S," "T", "J" and other shapes. The frame 150 includes a first flange in the form of a shear tie foot 562, a web 564, and a second flange, flange 566, in the form of an inner chord flange. The frame is primarily composed of material 552, such as CFRP. However, the frame also includes sacrificial material 554, which has been partially removed via machining until a desired thickness and smoothness is found at the frame 150. This machining process enables a flange datum plane 572 and a web datum plane 574 to be acquired during assembly, which facilitates alignment and placement of the frame 150. Further datums of any desired sort, at any desired location, may also be used. Furthermore, although a fastener 510 having a crown head is shown below, many fasteners are counter sunk and/or installed via a spotface tool. Spotfacing into the sacrificial material 554 is performed is to establish a constant fastener grip length upon installation. Therefore, one grip length fastener can be installed, and if needed, the sacrificial material 554 can be spotfaced to reduce the grip length needed for a fastener 510 to be installed. Therefore, spotfacing allows customizing of a frame 150 to suit a desired fastener grip length without the need to mill an entire length of the flange. Adjacent fastener holes may utilize different depths of spotfacing, which may be easier to accommodate than changing the depth of milling on a flange at the pitch of a fastener 510 (such as a flange formed by one or more sacrificial plies on an IML side of an outer flange). In further embodiments, the sacrificial plies may comprise carbon fibers or fiber glass, and can be added during a preform fabrication phase prior to hardening, or may be added after hardening in a post cure phase as desired.

A fastener 510 has been driven through the frame 150 and the skin 50 of the section of fuselage 12 in order to secure the frame 150 to the skin 50. In this embodiment, the fastener 510 comprises a lockbolt having a shank 512, threading 513, neck 514, and pintail 516. During installation of the fastener 510, a machine (not shown) grips the pintail 516 and swages a collar (not shown) onto the threading 513, which protrudes from the frame 150 (referred to as "grip length" on this FIG.). The machine then breaks the pintail 516 off of the fastener 510, leaving fastener 510 secured in place.

According to FIG. 5, a length of the shank 512 (L_SHANK) corresponds with a stackup thickness (T_STACKUP) defined by the thickness of skin 50 (T_SKIN) and a thickness the shear tie foot 562 (T_FRAME). This results in a grip length (GRIP LENGTH) corresponding to a combination of skin and flange thickness. When a desired grip length is achieved, a sufficient amount of threading is exposed to install a nut or lockbolt collar into position on a fastener 510. If the frame thickness varies between frames 150, or along a frame 150, then fasteners of different lengths are used to achieve desired grip lengths. However, the use of different fasteners presents logistical difficulties, and increases the complexity needed for machines that install the fasteners. To address this issue and enforce a single-size fastener installation process across a variety of frames 150, a technique is utilized to enforce a uniform frame thickness at the shear tie foot 562. Adjustments of the thickness of the frame 150 take into account variances in thickness of the skin 50 where the fastener 510 is to be installed. Reducing the thickness of the frame 150 where the fastener 510 penetrates allows for a common grip length for all fasteners attaching the frame 150 to the skin 50. In further embodiments, sacrificial material 554 is also placed on an OML side of the shear tie foot 562 of the frame 150. In such embodiments, the use of a sacrificial ply on the OML allows the flexibility of reducing flange thickness to maintain a consistent grip length for the fasteners. Machining the frame 150 allows for customizing of the frame 150. Customizing of the frame 150 results in a common grip length for the frame 150 to customize the frame 150 to suit the desired grip length. In still further embodiments, spotfacing techniques are utilized around fastener hole locations to provide a machined surface for seating a fastener 510. The spotface can be performed after the hole 610 is drilled through and then inspected for length.

Figure 6:
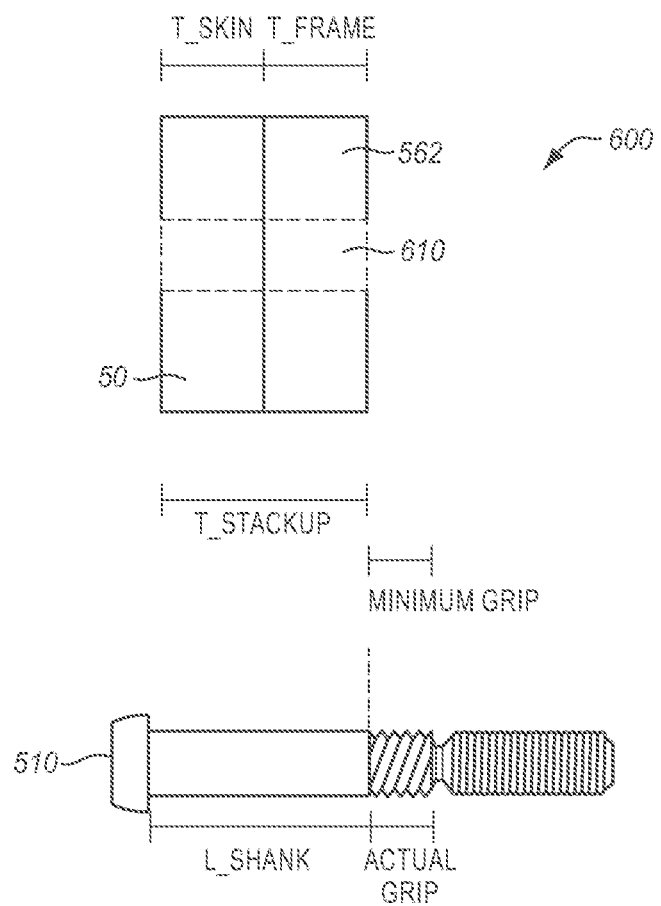
FIG. 6 depicts a stackup that is designed to be utilized with a predefined length of fastener in an illustrative embodiment.

FIG. 6 depicts a stackup 600 that is designed to be utilized with a predefined length of fastener 510 in an illustrative embodiment, and corresponds with view arrows 6 of FIG. 6. According to FIG. 6, the shear tie foot 562 is machined (when needed) to a thickness T_FRAME. This machining process ensures that the combination of T_FRAME with T_SKIN of the skin 50 provides a desired/designed grip length for a fastener 510 that is installed into a hole 610. This ensures that fasteners of a single grip length are utilized uniformly throughout the assembly process for frames 150, which in turn makes Just In Time (JIT) delivery of fasteners to holes much easier. Utilizing a single type of fastener 510 with a specified grip length reduces supply line burdens, because there is no need to supply, stock, and deliver fasteners for multiple grip lengths prior to installation. That is, because only one grip length is needed, a steady and smooth supply of fasteners is provided JIT, with no need for in-station inventory and no need for picking from among a variety of fasteners of varying grip length.

FIG. 7 is a flowchart illustrating a method 700 of machining a shear tie foot 562 to fabricate a stackup 600 for use with a predefined length of fastener 510 in an illustrative embodiment. Step 702 includes receiving a frame 150 comprising a web 564, a shear tie foot 562, and sacrificial material 554 that increases a thickness of the shear tie foot 562. In one embodiment, this comprises advancing the frame 150 to expose a new section of the frame 150 for receiving work by a machining station, for example, machining station 120 (shown in FIG. 1B). Depending on embodiment, the frame 150 is pulsed along the curved path by a distance less than its length, or is moved continuously towards the machining station 120. Depending on embodiment, machining station 120 either machines the frame 150 during pauses between pulses of the frame 150, or machines the frame 150 while the frame 150 advances during a pulse.

Step 704 includes machining the shear tie foot 562 to a thickness that, in combination with a thickness of a skin 50, corresponds with a grip length of a fastener 510, by machining the sacrificial material from the shear tie foot 562. Machining the sacrificial material includes removing some or all of the sacrificial material 554 from the shear tie foot 562 (also referred to as an OML flange). In one embodiment, machining is performed to achieve a desired fastener grip length that corresponds with the length of the shank 512 of the fastener 510. That is, as shown in FIGS. 5 and 6, the machining achieves a fit-up wherein the grip length of the fastener 510 matches the fastener grip length needed for the hole 610 it is installed into. In one embodiment, this method 700 further comprises spotfacing the sacrificial material 554 from the shear tie foot 562, resulting in a common grip length for the frame 150. In a further embodiment, the machining causes the thickness (T_FRAME) of the frame 150 to be equal along a length 156 of the frame 150, resulting in a grip length that is common to each fastener 510 installed through the skin 50 and the frame 150. In yet another embodiment, the method also includes machining additional frames 150 to exhibit thicknesses (T_FRAME) that are equal along the lengths 156 of the additional frames 150. The thickness for each additional frame 150 may be the same or different than the thickness for other frames 150.

In a further embodiment, machining the shear tie foot 562 comprises operating a machining station 120 that machines the shear tie foot 562 as the frame 150 advances along a curved path (e.g., arc 140). The curved path is circular, and has a radius corresponding to a radius of the frame 150. In one embodiment, machining is preceded by indexing the machining station 120 to the shear tie foot 562. The machining station 120 then removes sacrificial material until the desired thickness has been achieved, for example by removing sacrificial fiberglass and/or carbon plies from the shear tie foot 562, removing layers of CFRP with an adhesive layer between the parent frame and the CFRP, etc.

In one embodiment, the machining process is performed at a frame installation station prior to drilling and filling, such as by measuring a thickness of a stackup 600 between a frame 150 and a skin 50 before drilling is performed. In further embodiments, the machining operations are performed via assembly line 100 if desired dimensions are known a priori (e.g., due to inspection processes that characterize the frame 150 and/or skin 50), or are performed after holes 610 are drilled and grip length is measured. To maintain a desired grip length, varying amounts of sacrificial ply removal may be performed to accommodate variations in thickness of the skin 50. In many embodiments, reducing thickness is accomplished by reducing thickness of sacrificial material on the frame flange adjacent to the skin 50, to facilitate a desired constant grip length for fasteners, such as fastener 510, that join the two. The machining may be performed along the length of a frame 150 landing upon a half barrel section 24 of fuselage 12. In one embodiment, a hole 610 is drilled through the skin 50 and the frame 150, the grip length of this hole 610 is measured, plies of sacrificial material 554 are machined to achieve a desired grip length prior to installation of a fastener 510.

The desired thickness is selected such that a grip length formed by a resulting stackup of the shear tie foot 562 and a skin 50 consistently provides a desired grip length that corresponds with a single length of fastener 510. That is, the thickness of the shear tie foot 562 is chosen such that, even accounting for tolerance variations in thickness of the shear tie foot 562 and the skin 50, a single uniform and readily available fastener length will always provide a desired amount of grip length After the shear tie foot 562 has been machined and the frame 150 has exited an assembly line (e.g., assembly line 100), step 706 includes placing the shear tie foot 562 against an EVIL 422 of the skin 50. In some illustrative examples, the skin 50 is skin 50 of the half barrel section 24 of fuselage 12. In one embodiment, placing the shear tie foot 562 against the IML 422 of the skin 50 comprises aligning DA holes (not shown) or other datum features that facilitate the assembly process, and/or clamping the frame 150 into place. After alignment of the frame 150 at a section of fuselage 12, drilling operations are performed at the section of skin 50 for a fastener 510.

Step 708 includes installing a fastener 510 through the skin 50 and the frame 150 to fasten the frame 150. In some illustrative examples, step 708 includes installing a fastener 510 through the skin 50 and the shear tie foot 562 of the frame 150 to fasten the frame 150. In some illustrative examples, installing the fastener 510 fastens the frame 150 to a section of skin 50 to form a section of fuselage 12. Step 708 may be performed via suitable lockbolt installation machinery. Step 710 comprises securing the fastener 510 in place. In one embodiment, this comprises swaging a lockbolt collar onto the fastener 510.

Method 700 provides a technical benefit by ensuring that stackup thickness, even when it varies, still enables a frame 150 to be installed with a single length of fastener 510. This reduces the complexity needed for supply chains feeding fasteners to frame assembly systems (because there is no need to supply varying grip length fasteners, and further reduces the complexity needed by such frame assembly systems. Thus, cost and error rates are both reduced.

FIG. 8 depicts a frame 150 that awaits demolding from a mandrel 800 in an illustrative embodiment. In this embodiment, one or more sacrificial layers of sacrificial material 554 (e.g., fiberglass plies) have been added to the frame 150 (e.g., before or after the frame 150 is hardened from a preform) to increase a thickness of the frame 150. This is performed in order to ensure that the frame 150 never exhibits less than desired dimensions, and hence that the frame 150 can be machined to the desired dimensions. The sacrificial material 554 provides the capacity to dynamically adjust frame parameters, such as thickness, during assembly. In this embodiment, the frame 150 has been compacted against a contour 812 defined by a body 810 of the mandrel 800, in order to impart a desired shape to the frame 150. After the frame 150 has been hardened, the frame 150 will impart support and rigidity to a skin panel (e.g., skin 50 of FIGS. 1 and 4 when installed upon the skin 50.

Figure 9A:
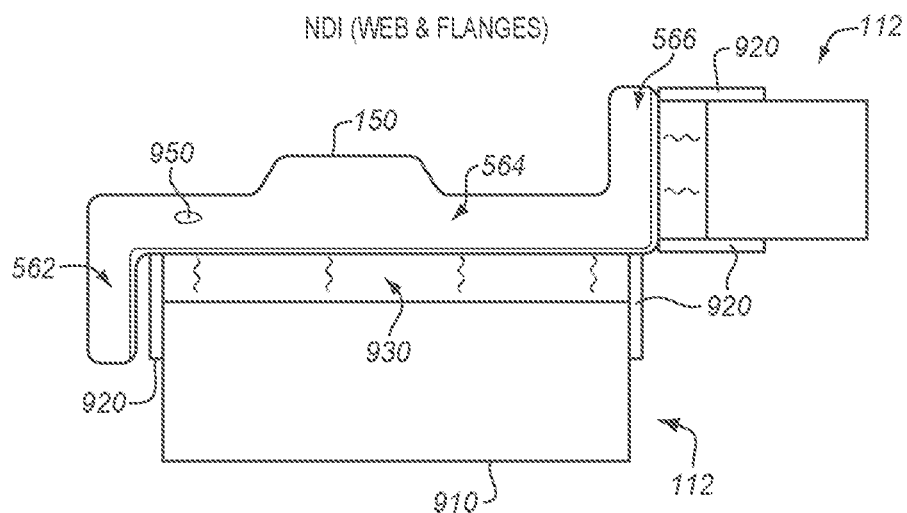
FIGS. 9A-9B and 10 depict Non-Destructive Inspection (NDI) operations performed by the NDI stations of FIG. 1B in an illustrative embodiment.
Figure 9B:
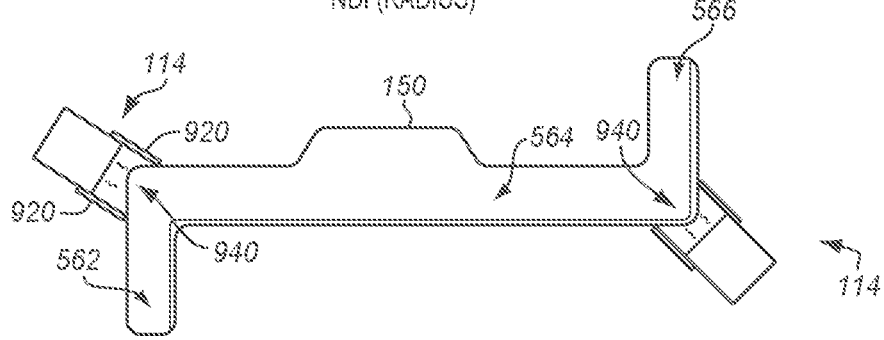
Figure 10:
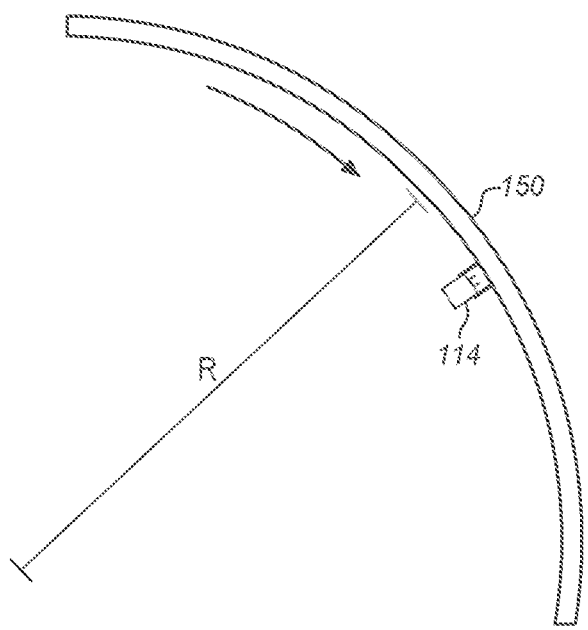

FIGS. 9A-9B and 10 depict Non-Destructive Inspection (NDI) operations performed by the NDI stations 112 and 114 of FIG. 1B in an illustrative embodiment. According to FIG. 9A, two NDI stations 112 (e.g., ultrasonic sensors) utilize walls 920 to form chambers 930 which are filled with an incompressible liquid (e.g., water). The NDI stations 112 utilize ultrasonic transducers 910 to detect out of tolerance conditions (e.g., voids 950) in the web 564, the flange that acts as the shear tie foot 562, and flange 566 of the frame 150, such as voids, changes in thickness, etc. In further embodiments, NDI inspections are performed for both flanges, as well as radius/corner that joins each flange to the web 564.

FIG. 9B depicts an embodiment wherein a radius 940 of each of one or more corners of a frame 150 are scanned/inspected via Non-Destructive Inspection (NDI) station 114. The inspections performed by these NDI stations 114 may occur at the NDI stations 112 depicted in FIG. 9A, or at additional stations that are disposed upstream or downstream of the NDI stations 112 of FIG. 9A.

In FIG. 10, a Non-Destructive Inspection (NDI) station 114 inspects a radius R (e.g., an inner or outer radius, a twist along a hoopwise length, etc.) of the frame 150 to ensure that the frame 150 is within desired tolerances. In a further embodiment, the frame 150 already exhibits a desired curvature imparted by a mandrel 800, and hence is assumed to be at a desired radius. NDI may further be utilized to detect out of tolerance conditions in the flanges of the frame 150, such as voids 950 (as shown in FIG. 9A). In further embodiments, NDI inspection is performed on flange 566 as well as shear tie foot 562. In further embodiments the ultrasonic transducers 910 are also moved relative to corners of the flanges in order to detect properties of those corners, such as radii.

Figure 11:
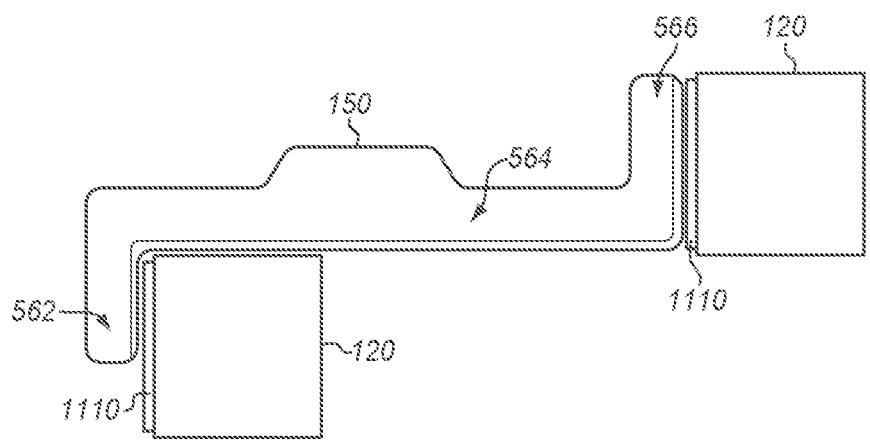
FIGS. 11-12 depict machining operations performed by the machining stations of FIG. 1B in an illustrative embodiment.
Figure 12:
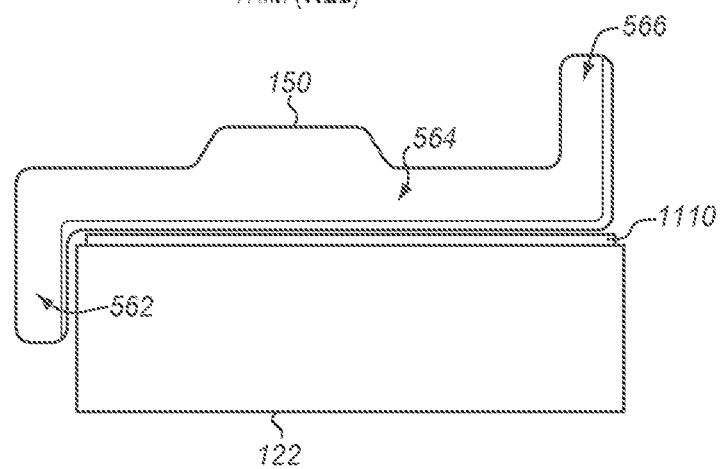

FIGS. 11-12 depict machining operations performed by the machining stations 120 and 122 of FIG. 1B in an illustrative embodiment. In FIG. 11, machining stations 120 are disposed at shear tie foot 562 and flange 566 of the frame 150, and utilize blades 1110 (e.g., reciprocating blades, spinning blades, etc.) to remove sacrificial material 554 therefrom. In further embodiments, machining stations 120 are utilized to remove sacrificial material 554 from either side of the inner or outer flanges of the frame 150 as needed for fitting the frame 150 to skin 50. In FIG. 12, a machining station 122 disposed at a web 564 of the frame 150 utilizes a blade 1110 to remove sacrificial material 554 from the web 564.

Figure 13:
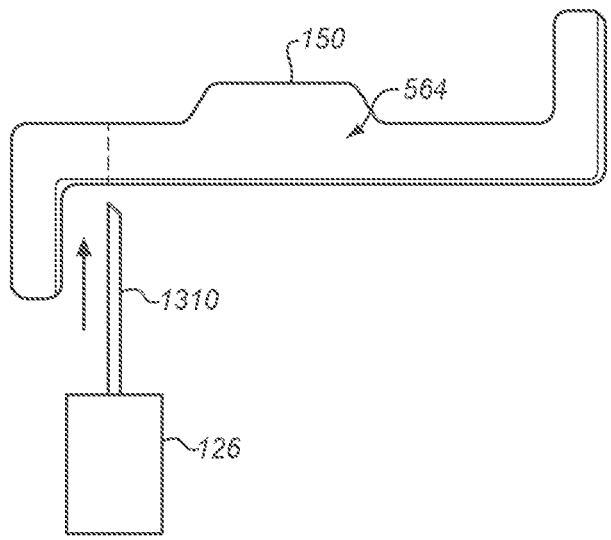
FIGS. 13-14 depict cut-out operations performed by the cut-out stations of FIG. 1B in an illustrative embodiment.
Figure 14:
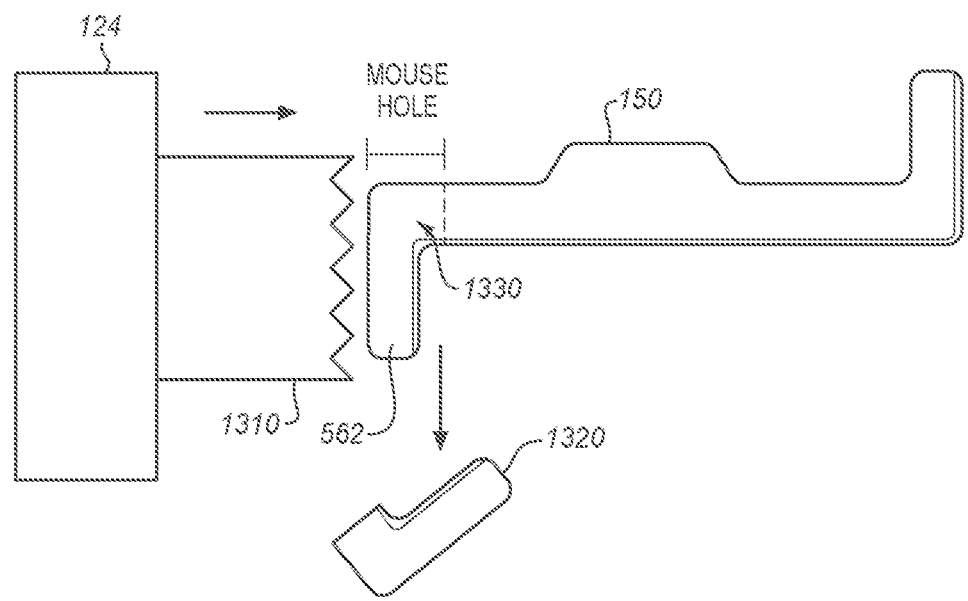

FIGS. 13-14 depict cut-out operations performed by the cut-out stations 124 and 126 of FIG. 1B in an illustrative embodiment. Specifically, in FIG. 13, a cut-out station 126 utilizes a blade 1310 (e.g., a reciprocating blade, spinning blade, etc.) to cut into a web 564 of the frame 150, and in FIG. 14, a cut-out station 124 utilizes a blade 1310 to cut into a shear tie foot 562 of the frame 150 and remove a piece of scrap 1320, forming a mouse hole 1330. In further embodiments, a radius is cut into a corner of the mouse hole 1330 in order to finish the mouse hole 1330. The removed material is considered manufacturing excess, and may have indexing features 158 and/or clocking features to facilitate transport disposed therein.

Figure 15:
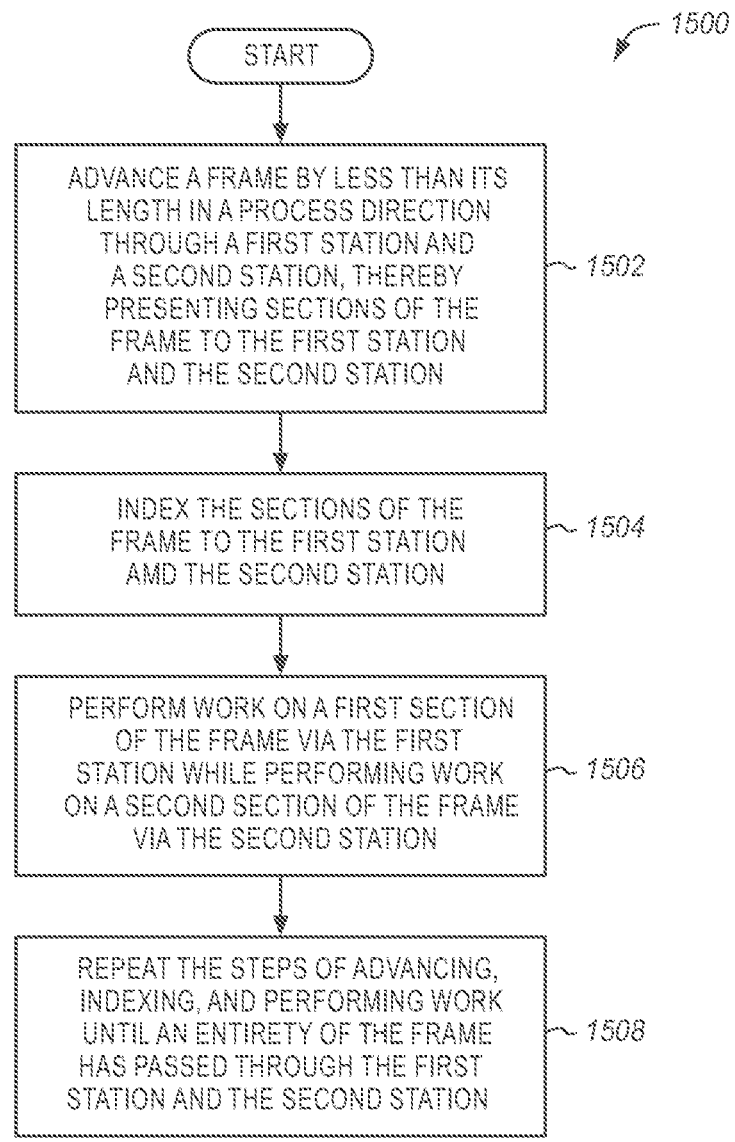
FIG. 15 is a flowchart illustrating a further method for operating an assembly line for a frame in an illustrative embodiment.

FIG. 15 is a flowchart illustrating a further method 1500 for operating an assembly line 100 for a frame 150 in an illustrative embodiment. Step 1502 includes advancing a frame 150 by less than its length in a process direction (as indicated by arrows P of FIG. 1B) through a first station and a second station, thereby presenting the lengthwise sections 154 of the frame 150 to the first station and the second station. In one embodiment, advancing the frame 150 comprises driving the frame 150 via drive unit 102, in order to expose new sections of the frame 150 to the first station and the second station.

Step 1504 includes indexing the sections 154 of the frame 150 to the first station and the second station. In one embodiment, indexing the frame 150 comprises placing an indexing feature 158 of the frame 150 into contact with an indexing feature 158 at the first station.

Step 1506 includes performing work on a first section of the frame 150 via the first station while performing work on a second section of the frame 150 via the second station. In one embodiment, the work performed by the first station is different from the second station, such as performing Non-Destructive Inspection (NDI) as opposed to performing machining. Any suitable number of stations may be utilized in tandem in this manner.

Step 1508 includes repeating the steps of advancing, indexing, and performing work until an entirety of the frame 150 has passed through the first station and the second station. In one embodiment, advancing the frame 150 moves the frame 150 through a third station, and the method further includes indexing a third section of the frame 150 to the third station, simultaneously performing work on the third section of the frame 150 via the third station while performing work on the second section of the frame 150 via the second station.

Figure 16:
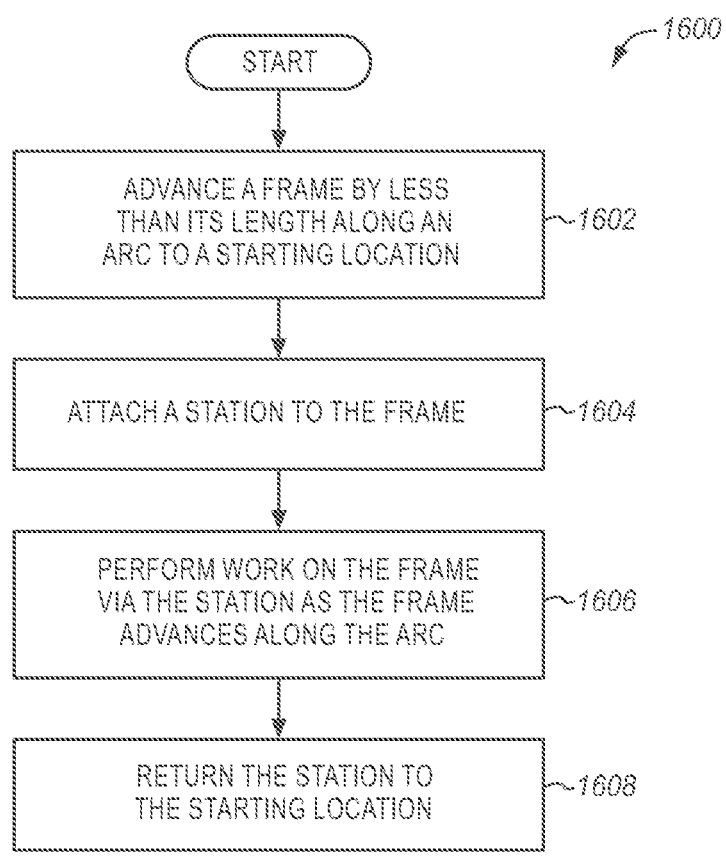
FIG. 16 is a flowchart illustrating a further method for operating an assembly line for a frame in an illustrative embodiment.

FIG. 16 is a flowchart illustrating a further method 1600 for operating an assembly line 100 for a frame 150 in an illustrative embodiment. Step 1602 includes advancing a frame 150 by less than its length along an arc to a starting location (e.g., the position of drilling station 116). In one embodiment, advancing the frame 150 comprises operating a drive unit 102 that physically interlocks with a manufacturing excess 157 at the frame 150. Step 1604 includes attaching a station (e.g., drilling station 116) to the frame 150. In some illustrative examples, the station may be referred to as a workstation. This operation can be performed by interlocking the station with a manufacturing excess 157 of the frame 150. Step 1606 includes performing work on the frame 150 via the station as the frame 150 advances along the arc. That is, the frame 150 advances in the process direction 197 (of FIG. 1B), which is arc shaped. In further embodiments, a station progresses along a frame 150 to perform work at another location along the frame 150 prior to detachment/disembarking from the frame 150. In one embodiment, the work comprises drilling a portion of the frame 150. Step 1608 includes returning the station to the starting location. In one embodiment, this comprises detaching the station and returning the station via a separate return path to the starting location.

Figure 17:
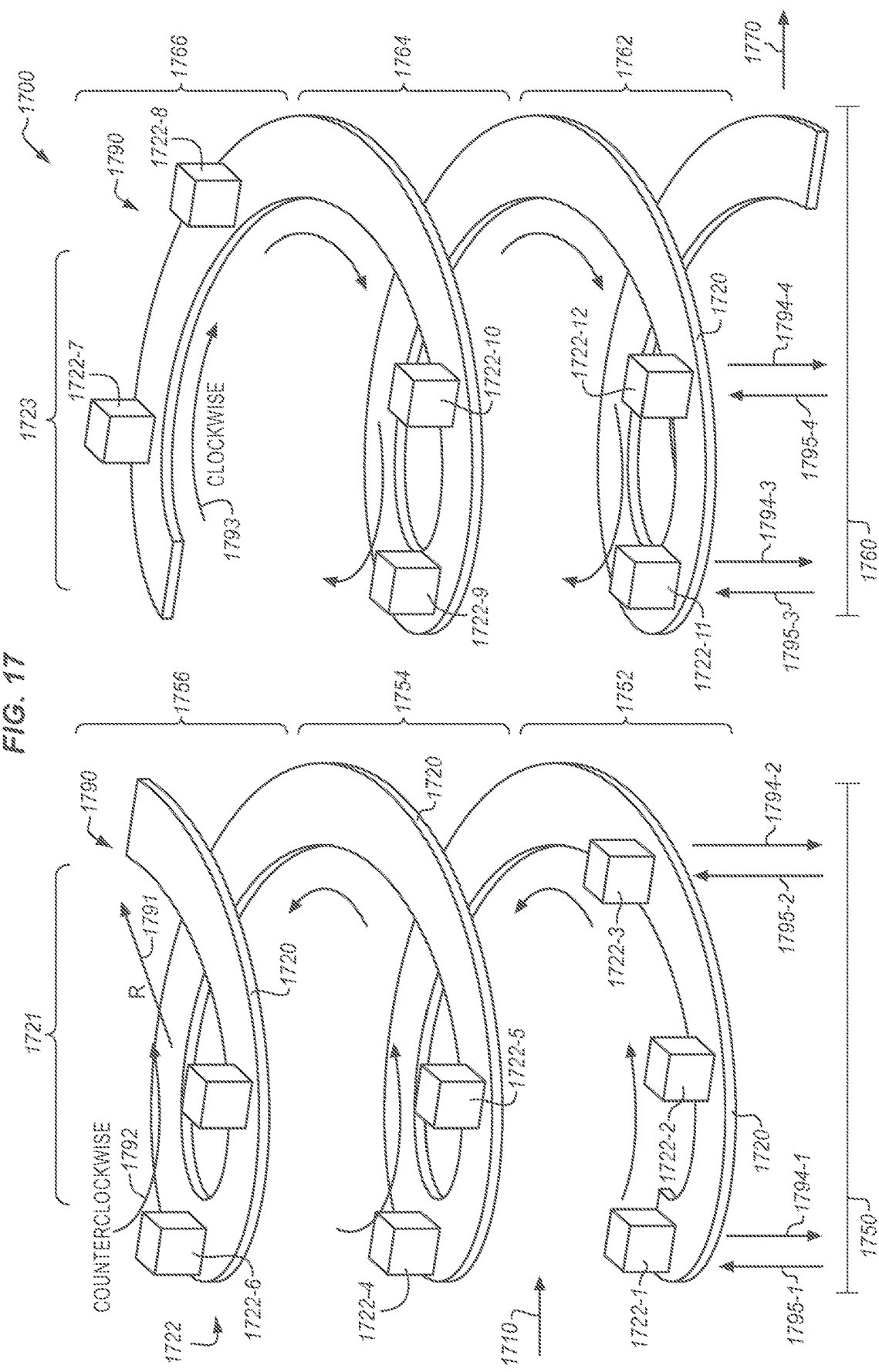
FIG. 17 depicts an arrangement of helical stacks for assembling a frame in an illustrative embodiment.

FIG. 17 depicts an arrangement of helical stacks for assembling a frame 150 in an illustrative embodiment. Specifically, FIG. 17 depicts an assembly line 1700 that includes a first helical stack 1750 and a second helical stack 1760. Frames are fed to an entrance 1710 for the first helical stack 1750, and proceed along a curved track 1720 across an array 1721 of stations 1722 (i.e., station 1722-1 through station 1722-6. In one embodiment, the array 1721 of stations 1722-1 through 1722-6 includes a Non-Destructive Inspection (NDI) station that inspects lengthwise sections of a frame 150 (e.g., an arcuate frame), or any other type of station discussed above with regard to the FIGS., such as the stations discussed above with regard to FIG. 1B.

The curved track 1720 is ramped upwards. That is, the curved track 1720 proceeds vertically at a pitch angle (not shown) in a helical shape 1790 that corresponds to a shape or radius of a frame 150 (not shown in FIG. 17). The helical shape 1790 may have a radius 1791 (R) that corresponds with a radius of a frame 150. The frames 150 proceed upward at a pitch angle (not shown) of the first helical stack 1750 as fabrication proceeds. Thus, the frames 150 continue along the curved track 1720 through a first layer 1752, second layer 1754, and third layer 1756. In further embodiments, any numbers of layers, occupying any amount of degrees (e.g., three hundred and sixty, one hundred and eighty, etc.), and frames 150 may be advanced clockwise 1793 or counterclockwise 1792 through the helical stacks 1750, 1760. During this time, stations 1722-1 through 1722-6 disposed along the curved track 1720 perform work on the frame 150 as the frame 150 advances along the curved track 1720. In further embodiments, multiple ones of stations 1722 may work at same time on the same frame, and multiple ones of stations 1722 may each work on different frames at the same time. The helical nature results in a greater work density of stations per square foot of manufacturing floor space.

FIG. 17 further depicts that frames 150 may proceed through an array 1723 of stations 1722-7 to 1722-12 at the second helical stack 1760, and proceed lower vertically according to a pitch angle (not shown) of the second helical stack through a third layer 1766, second layer 1764, and first layer 1762 before leaving via exit 1770. In a further embodiment, a tool (e.g., tool 159 of FIG. 1B) carries the frame 150 along the curved track 1720. In a further embodiment, a drive unit (e.g., drive unit 102 of FIG. 1B) advances the frame 150 by pulsing the frame 150 through the stations 1722-7 through 1722-12 by a distance less than a length of the frame 150. In one embodiment, pulsing the frame 150 is accomplished by physically interlocking a drive unit 102 with a tool 159 carrying the frame 150.

Frames 150 are input locally to each of the first helical stack 1750 and/or the second helical stack 1760, and are output locally as well to enable JIT delivery of frames 150.

FIG. 17 further depicts feeder lines 1795-1 through 1795-4, which provide materials JIT to stations 1722. Each of the feeder lines 1795-1 through 1795-4 may provide the same or different types of materials according to the same or different takt times. Outflows 1794-1 through 1794-4 remove materials (e.g., scrap) from the stations 1722. Each of the outflows 1794-1 through 1794-4 may remove different types of scrap or the same types of scrap as other outflows.

FIG. 18 is a flowchart illustrating a further method 1800 for operating an assembly line with first helical stack 1750 and second helical stack 1760 to assemble a frame 150 in an illustrative embodiment. Method 1800 includes receiving a frame 150 in step 1802, and advancing the frame 150 through an array 160 of stations (e.g., stations of FIG. 1B) in a helical arrangement corresponding to a shape of the frame 150 in step 1804. In some illustrative examples, the frame 150 is referred to as an arcuate frame. In some illustrative examples, the frame 150 advances clockwise through the array 160 of stations. In some illustrative examples, the frame 150 advances counterclockwise through the array 160 of stations. In some illustrative examples, advancing the frame 150 comprises coupling a drive unit 102 to a manufacturing excess 157 of the frame 150. In some illustrative examples, coupling comprises physically interlocking the drive unit 102 to the manufacturing excess 157. In one embodiment, advancing the frame 150 comprises pulsing the frame 150 through the stations by a distance less than its length. In further embodiments, advancing the frame 150 comprises causing the frame 150 to undergo helical motion. For example, the helical motion may follow an arc 140 having a radius that corresponds with a radius of the frame 150. In yet another embodiment, advancing the frame 150 comprises physically interlocking a drive unit 102 to a manufacturing excess 157 of the frame 150.

Step 1806 includes performing work on the frame 150 via at least one of the array 160 of stations in step 1806. In one embodiment, performing work on the frame 150 is accomplished via the series of stations upon different sections of the frame 150 at the same time. In further embodiments, performing work on the frame 150 occurs during pauses between pulses of the frame 150, or performing work on the frame 150 is performed while the frame 150 advances during a pulse. In still further embodiments, stations perform work upon a continuously advancing frame 150. In further embodiments, the Non-Destructive Inspection (NDI) stations (e.g., stations 112 through 126 of FIG. 1B) are indexed to indexing features 158 at a manufacturing excess 157 of the frame 150 prior to receiving work. In further embodiments, the indexing features 158 are disposed at a tool 159 (e.g., a frame carrier).

EXAMPLES

In the following examples, additional processes, systems, and methods are described in the context of a fabrication system for frames of an aircraft.

Referring more particularly to the drawings, embodiments of the disclosure may be described in the context of aircraft manufacturing and service in method 1900 as shown in FIG. 19 and an aircraft 1902 as shown in FIG. 20. During pre-production, method 1900 may include specification and design 1904 of the aircraft 1902, for aircraft 10 of FIG. 1A and material procurement 1906. During production, component and subassembly manufacturing 1908 and system integration 1910 of the aircraft 1902 takes place. Thereafter, the aircraft 1902 may go through certification and delivery 1912 in order to be placed in service 1914. While in service by a customer, the aircraft 1902 is scheduled for routine work in maintenance and service 1916 (which may also include modification, reconfiguration, refurbishment, and so on). Apparatus and methods embodied herein may be employed during any one or more suitable stages of the production and service described in method 1900 (e.g., specification and design 1904, material procurement 1906, component and subassembly manufacturing 1908, system integration 1910, certification and delivery 1912, service 1914, maintenance and service 1916) and/or any suitable component of aircraft 1902 (e.g., airframe 1918, systems 1920, interior 1922, propulsion system 1924, electrical system 1926, hydraulic system 1928, environmental system 1930).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 1902 produced by method 1900 may include an airframe 1918 with a plurality of systems 1920 and an interior 1922. Examples of systems 1920 include one or more of a propulsion system 1924, an electrical system 1926, a hydraulic system 1928, and an environmental system 1930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1900. For example, components or subassemblies corresponding to component and subassembly manufacturing 1908 may be fabricated or manufactured in a manner similar to components or subassemblies produced while the aircraft 1902 is in service. Also, one or more apparatus embodiments, method embodiments, or a combination thereof may be utilized during the subassembly manufacturing 1908 and system integration 1910, for example, by substantially expediting assembly of or reducing the cost of an aircraft 1902. Similarly, one or more of apparatus embodiments, method embodiments, or a combination thereof may be utilized while the aircraft 1902 is in service, for example and without limitation during the maintenance and service 1916. Thus, the invention may be used in any stages discussed herein, or any combination thereof, such as specification and design 1904, material procurement 1906, component and subassembly manufacturing 1908, system integration 1910, certification and delivery 1912, service 1914, maintenance and service 1916 and/or any suitable component of aircraft 1902 (e.g., airframe 1918, systems 1920, interior 1922, propulsion system 1924, electrical system 1926, hydraulic system 1928, and/or environmental system 1930).

In one embodiment, a part comprises a portion of airframe 1918, and is manufactured during component and subassembly manufacturing 1908. The part may then be assembled into an aircraft in system integration 1910, and then be utilized in service 1914 until wear renders the part unusable. Then, in maintenance and service 1916, the part may be discarded and replaced with a newly manufactured part. Inventive components and methods may be utilized throughout component and subassembly manufacturing 1908 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating an aircraft, the method comprising:
receiving a frame comprising one of a metal frame or a hardened composite frame;
advancing the frame through one station of an array of stations arranged in an arc to a starting location;
performing work on the frame via the one station at the starting location;
attaching a second station of the array of stations to the frame;
performing work on the frame via the second station as the frame advances along the arc; and
after performing work on the frame via the second station, returning the second station to the starting location.

2. The method of claim 1, wherein:
the arc corresponds to a shape of the frame.

3. The method of claim 1, wherein:
the one station of the array of stations comprises one of a Non-Destructive Inspection (NDI) station, a drilling station, a trimming station, a machining station, or a cut-out station; and
wherein performing the work on the frame via the one station comprises one of inspecting the frame, drilling the frame, trimming the frame, machining the frame, or performing cut-out operations on the frame.

4. The method of claim 1, further comprising:
advancing the frame through multiple stations of the array of stations; and
performing work on the frame via the multiple stations of the array of stations upon different sections of the frame at a same time.

5. The method of claim 1, wherein:
advancing the frame through the one station of the array of stations comprises pulsing the frame along the arc by a distance less than a length of the frame.

6. The method of claim 1, wherein:
advancing the frame through the one station of the array of stations comprises pulsing the frame along the arc by a distance equal to a length of the frame.

7. The method of claim 1, wherein:
advancing the frame comprises moving the frame along the arc continuously.

8. The method of claim 7, wherein:
performing work on the frame via the one station occurs during pauses between pulses of the frame.

9. The method of claim 7, wherein:
performing work on the frame via the one station is performed while the frame advances during a pulse.

10. The method of claim 1, wherein:
advancing the frame comprises causing the frame to undergo circular motion.

11. The method of claim 1, further comprising:
indexing the stations of the array to indexing features at a manufacturing excess of the frame.

12. The method of claim 1, wherein:
advancing the frame comprises physically interlocking a drive unit to a manufacturing excess of the frame.

13. The method of claim 1, wherein:
the frame is held by a tool that includes indexing features and is advanced through the array of stations and further comprising:
interlocking a drive unit with the tool while the tool carries the frame.

14. The method of claim 1, wherein:
the array of stations includes a Non-Destructive Inspection (NDI) station that inspects lengthwise sections of the frame.

15. The method of claim 14, wherein:
the array of stations further includes an additional Non-Destructive Inspection (NDI) station for inspecting radii.

16. The method of claim 14, wherein:
the array of stations includes a drilling station, disposed downstream of the Non-Destructive Inspection (NDI) station, and configured to drill Determinant Assembly (DA) holes into lengthwise sections of the frame.

17. The method of claim 16, wherein:
the array of stations includes a machining station, disposed downstream of the drilling station, and configured to trim lengthwise sections of the frame to form datum planes at the frame.

18. The method of claim 17, wherein:
the array of stations includes a cut-out station, disposed downstream of the machining station, that is configured to cut out mouse holes from lengthwise sections of the frame.

19. The method of claim 14, wherein:
the Non-Destructive Inspection (NDI) station is configured to inspect a web and flanges of the frame, and the array of stations further comprises an additional Non-Destructive Inspection (NDI) station configured to inspect a radius of the frame.

20. The method of claim 1, wherein:
advancing the frame through the one station of the array of stations comprises advancing the frame along the arc clockwise.

21. The method of claim 1, wherein:
advancing the frame through the one station of the array of stations comprises advancing the frame along the arc counterclockwise.

22. The method of claim 10, wherein:
the circular motion follows the arc, the arc having a radius that corresponds with a radius of the frame.

23. The method of claim 1, wherein:
the frame is held by a tool that includes indexing features and is advanced through the array of stations.

24. The method of claim 3, wherein:
the Non-Destructive Inspection (NDI) station is disposed upstream of the machining station.

25. The method of claim 3, wherein:
the Non-Destructive Inspection (NDI) station is disposed downstream of the machining station.

26. A method for fabricating an aircraft, the method comprising:
receiving a frame comprising one of a metal frame or a hardened composite frame;
advancing the frame through multiple stations of an array of stations arranged in an arc by pulsing the frame along the arc, the arc corresponding to a shape of the frame, the array of stations comprises at least one of a Non-Destructive Inspection (NDI) station, a drilling station, a trimming station, a machining station, or a cut-out station; and performing work on the frame via the multiple stations of the array of stations upon different sections of the frame at a same time during pauses between pulses of the frame, wherein performing the work on the frame via the multiple stations upon the frame comprises at least one of inspecting the frame, drilling the frame, trimming the frame, machining the frame, or performing cut-out operations on the frame.

27. The method of claim 26, wherein:
advancing the frame through multiple stations of the array of stations comprises pulsing the frame along the arc by a distance less than a length of the frame.

28. The method of claim 26, wherein:
advancing the frame comprises causing the frame to undergo circular motion, the circular motion follows the arc, the arc having a radius that corresponds with a radius of the frame.

29. The method of claim 26, further comprising:
indexing the multiple stations of the array of stations to indexing features at a manufacturing excess of the frame.

30. The method of claim 26, wherein:
advancing the frame comprises physically interlocking a drive unit to a manufacturing excess of the frame.

* * * * *